(12) United States Patent
Kudo et al.

(10) Patent No.: US 9,003,081 B2
(45) Date of Patent: Apr. 7, 2015

(54) COMPUTER SYSTEM AND CONTROL METHOD THEREOF

(75) Inventors: Shintaro Kudo, Yokohama (JP); Yusuke Nonaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 155 days.

(21) Appl. No.: 13/512,833

(22) PCT Filed: May 18, 2012

(86) PCT No.: PCT/JP2012/003289
§ 371 (c)(1),
(2), (4) Date: May 30, 2012

(87) PCT Pub. No.: WO2013/171809
PCT Pub. Date: Nov. 21, 2013

(65) Prior Publication Data
US 2013/0311685 A1    Nov. 21, 2013

(51) Int. Cl.
*G06F 3/00* (2006.01)
*G06F 5/00* (2006.01)
*G06F 3/06* (2006.01)

(52) U.S. Cl.
CPC ............ *G06F 3/0611* (2013.01); *G06F 3/0658* (2013.01); *G06F 3/0659* (2013.01); *G06F 3/067* (2013.01)

(58) Field of Classification Search
CPC .................. G06F 17/30575; Y10S 707/99952
USPC .......................................................... 710/40
See application file for complete search history.

(56) References Cited

U.S. PATENT DOCUMENTS

| | | | |
|---|---|---|---|
| 5,960,455 A | 9/1999 | Bauman | |
| 6,182,177 B1 * | 1/2001 | Harriman | 710/112 |
| 6,397,304 B1 | 5/2002 | George | |
| 6,718,347 B1 * | 4/2004 | Wilson | 1/1 |
| 7,003,610 B2 * | 2/2006 | Yang et al. | 710/260 |
| 8,090,832 B1 | 1/2012 | Semke et al. | |
| 8,255,914 B1 * | 8/2012 | Joyce et al. | 718/103 |
| 2011/0138085 A1 | 6/2011 | Serizawa et al. | |
| 2011/0179231 A1 | 7/2011 | Roush | |

FOREIGN PATENT DOCUMENTS

| | | |
|---|---|---|
| EP | 1 936 487 A2 | 6/2008 |
| JP | 3719976 B2 | 11/2005 |
| JP | 2008-269424 A | 11/2008 |

OTHER PUBLICATIONS

PCT International Search Report on application PCT/JP2012/003289 mailed Jun. 2, 2013; 3 pages.

* cited by examiner

*Primary Examiner* — Chun-Kuan Lee
(74) *Attorney, Agent, or Firm* — Foley & Lardner LLP

(57) ABSTRACT

The present invention is a clustered storage system with which, even when access to the processor of another controller is sent from the processor of one controller, the processor of the second controller is able to prioritize processing of this access so that I/O processing is also prevented from being delayed. With the storage system of the present invention, the first processor of the first controller transmits request information which is to be processed by the second processor of the second controller to the second processor by differentiating between request information for which processing is to be prioritized by the second processor and request information for which processing is not to be prioritized, and the second processor acquires the request information by differentiating between request information for which processing is to be prioritized and request information for which processing is not to be prioritized.

18 Claims, 27 Drawing Sheets

REQUEST TRANSMISSION PROGRAM

FIG.10

REQUEST PROCESSING IDENTIFICATION TABLE 111

| IDENTIFICATION CODE (1110) | COMMUNICATION TYPE (1111) | ACCESS DESTINATION (1112) |
|---|---|---|
| 0x00 | READ | SHARED MEMORY |
| 0x01 | WRITE | SHARED MEMORY |
| 0x02 | ATOMIC | SHARED MEMORY |
| 0x10 | ACTIVATE TRANSFER | DMA |
| 0x11 | ZERO DATA FILE | DMA |
| 0x20 | READ TRANSFER | HOST_IF |
| 0x21 | WRITE TRANSFER | HOST_IF |
| 0x30 | READ TRANSFER | DRIVE_IF |
| 0x31 | WRITE TRANSFER | DRIVE_IF |
| 0x40 | READ | TIMER |
| 0x41 | WRITE | TIMER |
| 0x50 | PARITY GENERATION | PARITY GENERATOR |
| ... | ... | |

FIG.11

ACCESS DESTINATION ATTRIBUTE TABLE 112

| ACCESS DESTINATION | SHARED INFORMATION |
|---|---|
| SHARED MEMORY | Yes |
| DMA | No |
| HOST_IF | No |
| DRIVE_IF | No |
| TIMER | Yes |
| PARITY GENERATOR | No |
| ... | ... |

(columns: 1120, 1121)

OWN/OTHER SYSTEM DETERMINATION TABLE 110

FIG.17

DEDICATED CORE DETERMINATION TABLE 113

| CORE | CORE TYPE | INTERRUPT RECEIVABILITY |
|---|---|---|
| CTL0-0 | DEDICATED CORE | - |
| CTL0-1 | NORMAL CORE | POSSIBLE |
| CTL0-2 | NORMAL CORE | POSSIBLE |
| CTL0-3 | NORMAL CORE | IMPOSSIBLE |
| CTL1-0 | DEDICATED CORE | - |
| CTL1-1 | NORMAL CORE | POSSIBLE |
| CTL1-2 | NORMAL CORE | POSSIBLE |
| CTL1-3 | NORMAL CORE | IMPOSSIBLE |
| ... | ... | ... |

REQUEST SYSTEM REQUIREMENT TABLE 114

| ACCESS DESTINATION | ACCESS TYPE | EXPECTED RESPONSE TIME |
|---|---|---|
| SHARED MEMORY | READ | 10 |
|  | NONPOSTED WRITE | 10 |
|  | ATOMIC UPDATE | 10 |
| DMA | START TRANSFER | 100 |
| HOST_IF | READ TRANSFER | 100 |
|  | WRITE TRANSFER | 100 |
| DRIVE_IF | READ TRANSFER | 100 |
|  | WRITE TRANSFER | 100 |
| TIMER | READ | 10 |
|  | WRITE | 10 |
| ... | ... | ... |

FIG.22A

REQUEST SYSTEM USABILITY TABLE 115

| REQUEST DESTINATION | REQUEST SYSTEM | USABILITY | EXPECTED RESPONSE TIME |
|---|---|---|---|
| CORE0 | INTERRUPT | ○ | 10 |
|  | NORMAL | × | - |
| CORE1 | INTERRUPT | ○ | 10 |
|  | NORMAL | ○ | 5 |
| CORE2 | INTERRUPT | ○ | 10 |
|  | NORMAL | ○ | 30 |
| CORE3 | INTERRUPT | × | - |
|  | NORMAL | × | - |
| CORE NOT SELECTED | INTERRUPT | ○ | 10 |
|  | NORMAL | ○ | 2 |
| ... |  | ... | ... |

1153 = REQUEST DESTINATION
1150 = REQUEST SYSTEM
1151 = USABILITY
1152 = EXPECTED RESPONSE TIME

FIG.22B

REQUEST SYSTEM USABILITY TABLE 115

| REQUEST DESTINATION | REQUEST SYSTEM | USABILITY | EXPECTED RESPONSE TIME |
|---|---|---|---|
| CORE0 | INTERRUPT | × | – |
|  | NORMAL | ○ | 5 |
| CORE1 | INTERRUPT | × | – |
|  | NORMAL | ○ | 30 |
| CORE2 | INTERRUPT | ○ | 10 |
|  | NORMAL | ○ | 30 |
| CORE3 | INTERRUPT | × | – |
|  | NORMAL | × | – |
| CORE NOT SELECTED | INTERRUPT | ○ | 10 |
|  | NORMAL | ○ | 15 |
| ... |  | ... | ... |

FIG.24

VOLUME PERFORMANCE REQUIREMENT TABLE 116

| VOLUME NUMBER | EXPECTED COMMUNICATION RESPONSE TIME CORRECTION VALUE |
|---|---|
| 0 | 1.0 |
| 1 | 0.8 |
| 2 | 0.5 |
| 3 | 1.5 |
| ... | ... |

COMPUTER SYSTEM AND CONTROL METHOD THEREOF

TECHNICAL FIELD

The present invention relates to a storage system and a control method thereof with which data I/O processing between a host and storage areas is controlled and, more particularly, relates to a clustered storage system in which controllers for executing data transmission and reception between the host and storage devices are multiplexed.

BACKGROUND ART

A storage system in which controllers for controlling access between a host and storage areas are multiplexed is known as a clustered storage system. With this type of storage system, in order to effectively operate a plurality of controllers, the processor of a certain controller must access hardware resources such as a main memory and an interface of another controller. Therefore, in order to make this access rapid and reliable, the processor does not directly access the hardware, rather, the processor gains access via a dedicated LSI for access. As storage systems which comprise clustered controllers, the storage systems disclosed in Japanese Published Patent No. 3719976 and Japanese Published Unexamined Application No. 2008-269424 are known.

CITATION LIST

Patent Literature

PTL 1: Japanese Published Patent No. 3719976
PTL 2: Japanese Published Unexamined Application No. 2008-269424

SUMMARY OF INVENTION

Technical Problem

In recent years, due partly to conditions which have led to improvements in the performance of general-purpose LSI, a need has arisen to build cluster controllers for storage systems by using general-purpose products without using a dedicated LSI. In a storage system of this type, a plurality of controllers can be accessed by connecting the processors of two controllers via a PCI-Express bus or similar.

In this type of storage system, because a dedicated LSI is not used, the processor of the first controller is unable to directly access hardware resources such as the data transfer hardware and memory and the like of a second controller, but the processor of the first controller may issue a request to the processor of the second controller to access the resources and may receive the results of this access from the processor of the second controller.

However, there is a problem in that the processor of the second controller performs host I/O processing frequently and, during such processing, though a request is received from the processor of the first controller, it is not possible to respond to the request directly, thus reducing the response performance in comparison with a storage system which uses a dedicated LSI.

Therefore, the processor of the second controller must be made to prioritize the processing of the requests from the processor of the first controller. A method exists in which an interrupt request is used between processors for this type of prioritized processing. However, when an interrupt is generated, it is necessary to switch the processing from the process which the OS has been working on so far to a normal interrupt handler, and there is a problem in that the overhead is large due to the time required to switch the process and in that, when interrupt requests are used extensively, the performance instead drops.

Furthermore, a method may also be considered for shortening the response time to requests received from another controller by using a multicore processor as the processor, electing one of the plurality of cores as a dedicated core for receiving requests from the other controller, and ensuring that this core does not perform normal processing such as host I/O processing. However, when there is a large load on the dedicated core, processing of a request from the other controller is delayed, whereas, when the number of dedicated cores is increased, the proportion of normal cores is small and it is also likely that the performance of the host I/O processing will be affected.

Therefore, the present invention has an object of providing a clustered storage system with which, even when access to the processor of another controller is sent from the processor of one controller, the processor of the another controller is able to prioritize processing of this access so that I/O processing is also prevented from being delayed.

Solution to Problem

In order to achieve the foregoing object, the present invention is a storage system and a control method thereof, wherein the first processor of the first controller transmits request information which is to be processed by the second processor of the second controller to the second processor by differentiating between request information for which processing is to be prioritized by the second processor and request information for which processing is not to be prioritized, and the second processor acquires the request information by differentiating between request information for which processing is to be prioritized and request information for which processing is not to be prioritized.

According to the present invention, the second processor does not prioritize processing of all the request information from the first processor, rather, request information is processed because prioritization thereof is required in order to operate the storage system, and therefore processing of I/Os from the host by the second processor is also prevented from being delayed.

Advantageous Effects of Invention

With the present invention, in a clustered storage system, even when access to the processor of another controller is sent from the processor of one controller, the processor of the second controller is able to prioritize processing of this access so that I/O processing is also prevented from being delayed.

BRIEF DESCRIPTION OF DRAWINGS

FIG. 10 is a configuration example of a request processing identification table.

FIG. 11 is an access destination attribute table.

FIG. 17 is a configuration example of a dedicated core determination table.

FIG. 21 is an example of a request system requirement table.

FIG. 22A is a first example of a request system usability table.

FIG. 22B is a second example of the request system usability table.

FIG. 24 is a configuration example of a volume performance requirement table which determines the aforementioned performance requirements for each volume.

DESCRIPTION OF EMBODIMENTS

Embodiment 1

Figure 1:
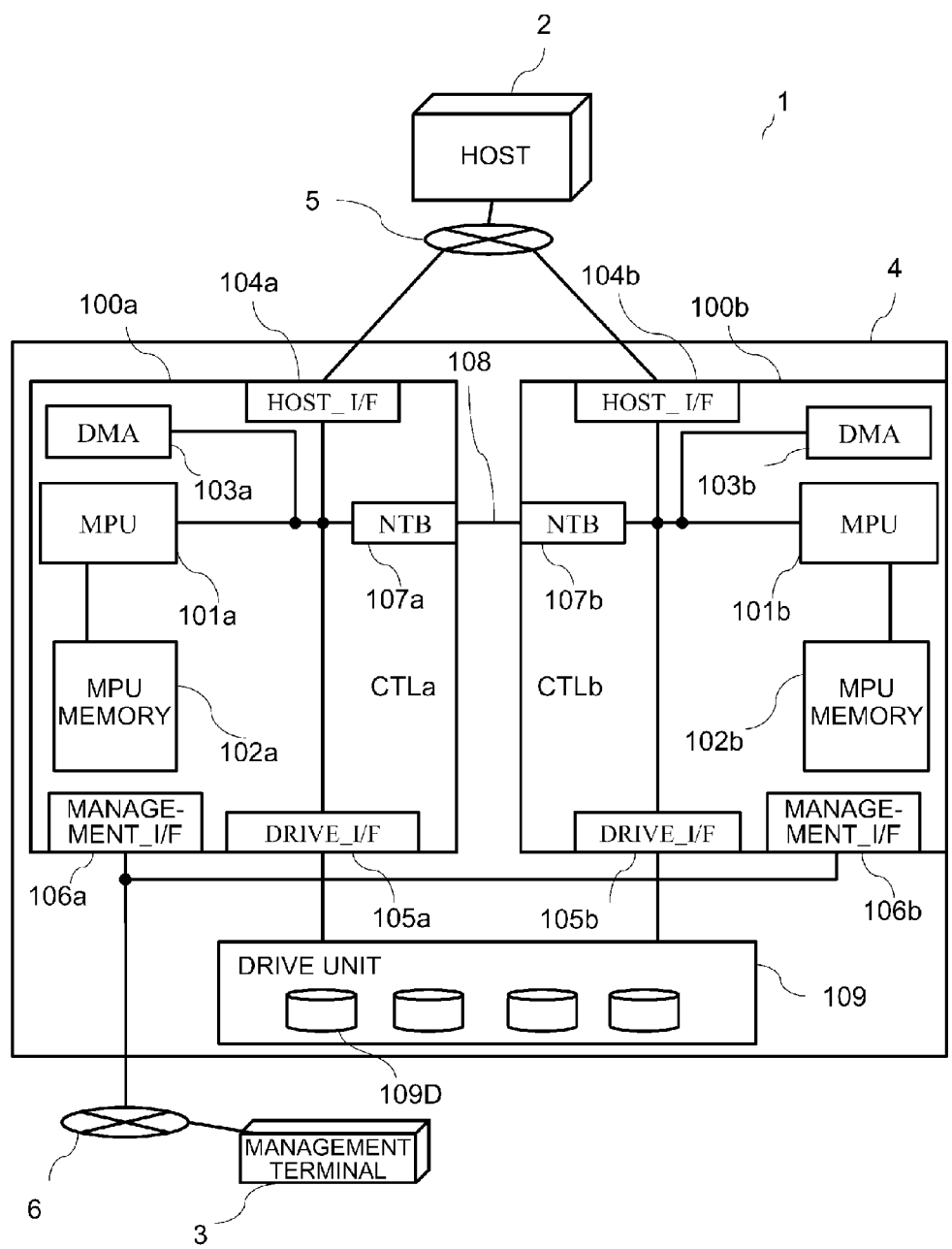
FIG. 1 is a hardware block diagram of a computer system which comprises a storage system according to a first embodiment.

An embodiment of a storage system according to the present invention will be described next on the basis of the drawings. The storage system comprises a dual controller configuration. FIG. 1 is a hardware block diagram of the computer system comprising a storage system according to a first embodiment. The computer system 1 comprises a host 2, a management terminal 3, a storage system 4, and networks 5 and 6. The network 5 serves to connect the host 2 to the storage system 4 and is, in particular, a SAN. The network 6 connects the storage system 4 to the management terminal 3 and is, in particular, a LAN. The host 2 is, for example, a large general-purpose computer, a server, or a client terminal. The host 2 may also be connected to the storage system 4 without passing via the SAN 5. Further, the management terminal 3 may also be connected to the storage system without passing via the LAN 6.

The storage system 4 comprises a first controller 100a, a second controller 100b, and a drive unit 109 which comprises a plurality of storage drives 109D. The first controller 100a may be referred to as the "CTLa" and the second controller 100b may be referred to as the "CTLb." Furthermore, when referring to the components in the controller, if the component CTLa is distinguished from the component CTLb, "a" is appended after the reference sign of the former component and "b" is appended after the reference sign of the latter component. The same reference sign is assigned to the same component. If a distinction between both the components CTLa and CTLb is unnecessary, "a" and "b" are not appended. When there is a distinction made between the two controllers, one controller is called the internal system controller and the other controller is called the external system controller.

The CTLa comprises an MPU 101a, an MPU memory 102a, a DMA 103a, a HOST_I/F (I/F: abbreviation for interface, the same subsequently) 104a, a DRIVE_I/F 105a, and a management_I/F 106a. The same is true of the CTLb. The HOST_I/F 104a of the CTLa and the HOST_I/F 104b of the CTLb are each connected to the host 2 via the SAN 5. The DRIVE_I/F 105a of the CTLa and the DRIVE_I/F 105b of the CTLb are each connected to the drive unit 109. The management_I/F 106a of the CTLa and the management_I/F 106b of the CTLb are each connected to the management terminal 3 via the LAN 6.

An NTB 107a of the CTLa and an NTB 107b of the CTLa are each nontransparent bridges. The MPU 101b and the MPU 101a are connected via the NTB 107a and 107b using a full-duplex system high-speed bus 108 with a transfer speed of at least 5 Gbps and are able to exchange user data and control information and the like. There may be a plurality of the NTB 107 and the connection path 108. The drive unit 109 comprises LU (Logical Units) as a plurality of logical storage areas. The storage drives 109D of the drive unit 109 area are each configured from a storage medium such as a magnetic disk or an SSD.

Figure 2:
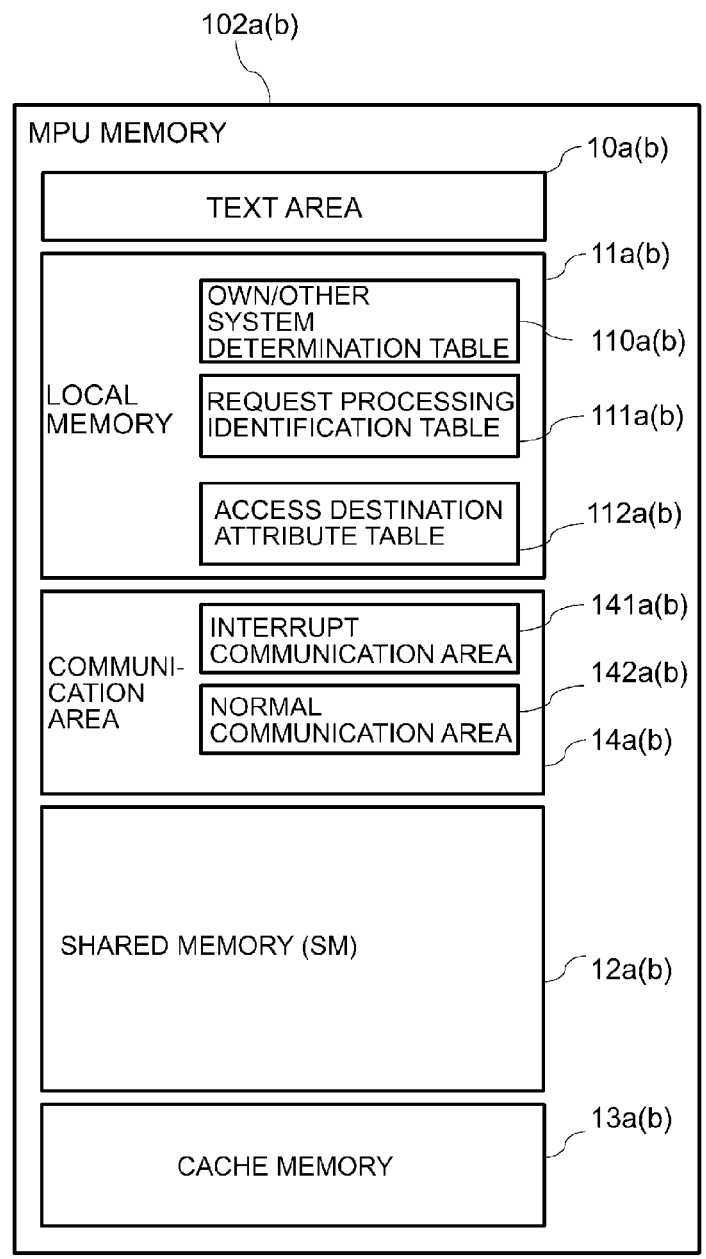
FIG. 2 is a block diagram according to a configuration example of an MPU memory of a controller.

The configuration of the MPU memory 102a of the CTLa will be described next on the basis of FIG. 2. The MPU memory 102b of the CTLb is the same. The MPU 102a comprises a text area 10a, an area for a local memory 11a, an area for a communication area 14a, an area of a shared memory (called "SM" hereinbelow) 12a, an area of a cache memory 13a, each area is configured as an address area. The areas each store programs, control information, or various data.

The text area 10a stores various programs enabling the storage system to implement its functions. The local memory 11a stores tables which are referenced by the programs of the text area 10a. These tables are not referenced by the programs of the text area of the CTLb. The programs of the text area of the MPU memory 102b reference the local memory 11b of the MPU memory 102b.

As the tables of the local memory 11a, for example, an internal/external system determination table 110, a proxy access identification table 111, and a hardware attribute table 112. A description of each table will be provided subsequently.

The communication area 14a comprises an interrupt communication area 141a and a normal communication area 142a. Control information and data are written by the MPU 101b to this communication area. Control information and data are written by the MPU 101a to the interrupt communication area 141b and the normal communication area 142b of the communication area 14b of the MPU memory 102b.

The SM 12a stores storage system configuration information and control information which must be shared by the CTLa and CTLb. This information includes information of the internal system controller and information of the external system controller. The SM12b of the external system controller is the same. This information will be called shared information hereinbelow.

The shared information is information which is required to control the storage system. More specifically, the shared information is control information for establishing consistency, between controllers, of cache management information for data which is stored in the memory and exchanged with the host computer, a startup register for data transfer hardware resources such as a host interface, a disk interface, or a DMA, exclusive management information such as lock bits for implementing a lock mechanism for exclusive access to these hardware resources, setting or update information for the hardware resource configurations which must also be recognizable to the other controller, and storage applications (for example, a volume copy function for creating replicated images of volumes, a virtual volume function for virtualizing and, if necessary, assigning a physical volume capacity, and a remote copy function for implementing disaster recovery by performing data copying to a remote site).

If this shared information exists in the SM 12a of one controller, the shared information is referenced via the MPU 101a of the one controller by the MPU 101b of the external system controller. For example, because the index information of the cache memory 13a exists in the controller 100a which comprises the cache memory, if the external system controller 100b references the index information, the external system controller 100b accesses the index information via the MPU 101a of the controller 100a which comprises the cache memory 13a.

The cache memory 13a temporarily holds user data which is stored on the disk without user data by the host 2. The cache memory 13b of the external system controller is also the same.

Figure 3:
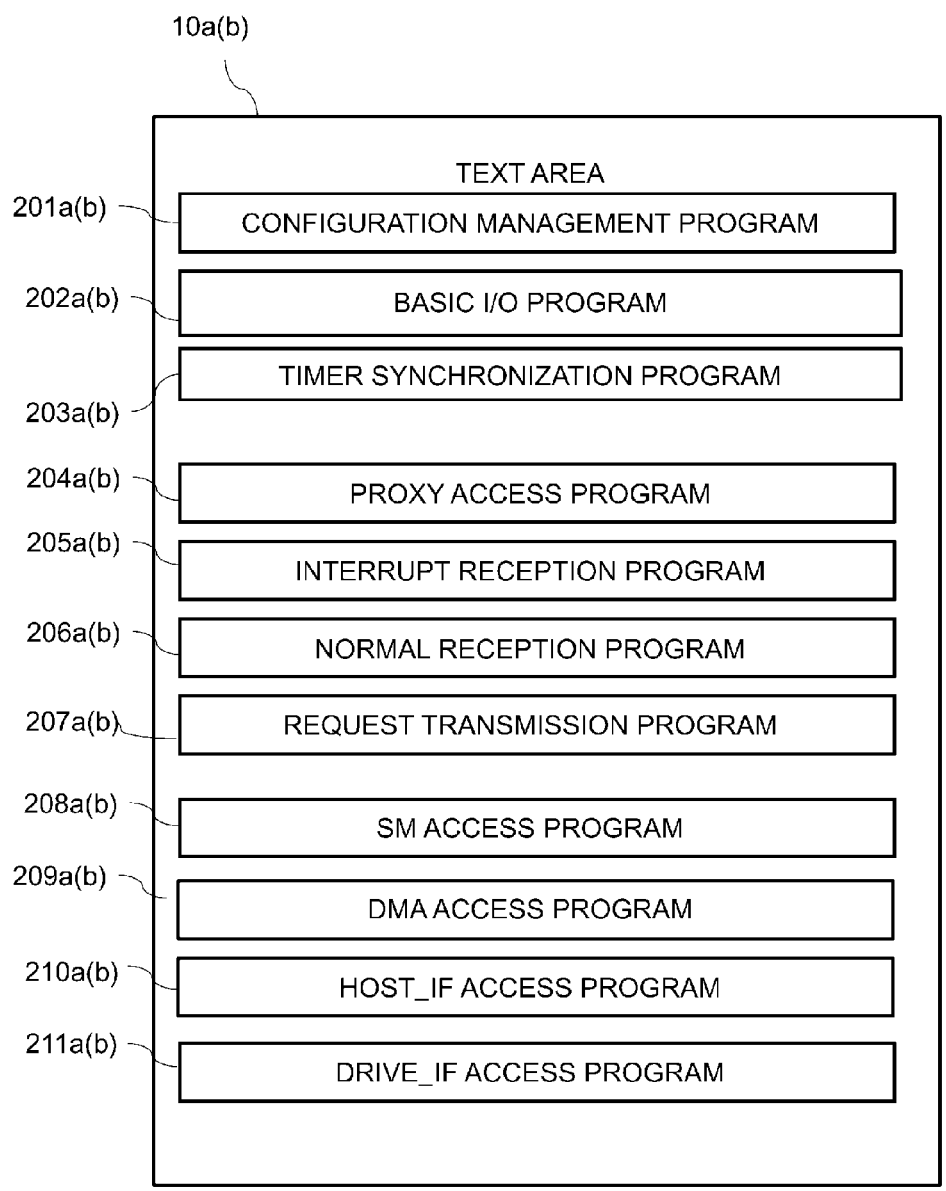
FIG. 3 is a block diagram showing a configuration of software resources in a text area of an MPU memory.

FIG. 3 is a configuration diagram of software resources of the text area 10a. The software resources comprise a configuration management program 201, a basic I/O program 202, a timer synchronization program 203a, a proxy access program 204a, an interrupt reception program 205a, a normal reception program 206a, a request transmission program 207a, an SM access program 208a, a DMA access program 209a, a HOST_IF access program 210a, and a DRIVE_IF access program 211a. These programs are executed by the MPU 101a. The text area of the CTLb is also the same.

The configuration management program 201a is started up by a command from the management terminal 3, and is able to reference and update the configuration management information. The configuration management information is information and so on for managing hardware such as the drive unit 109, the HOST_IF 104, and the DRIVE_IF 105, and logical components such as logical volumes which are configured from one or more storage drives. The configuration information of the CTLa and the configuration information of the CTLb are recorded in the SMa (12a) and the SMb (12b).

In order for a plurality of controllers to be centrally operated by the host, if configuration information of one controller is updated, this controller is desirably synchronized with the other controller. This synchronization is achieved, when the MPU 102a updates the configuration information of the SM 12a of the internal system controller, as a result of the MPU 102a writing this update to the SM 12b of the external system controller, for example.

The MPU 101a of the controller 100a which comprises the management_I/F 106a accessed by the management terminal 3 updates the configuration management information of the same SM 12a and sets the configuration information update determination flag for the communication area 14b in the MPU memory 102b of the external system controller 100b to ON. The MPU 101b of the external system controller references the update flag and, if the flag is ON, acquires the latest configuration information of the SM 12a from the MPU 101a of the controller 100a and updates the update information of the SM 12b of its own controller 100b and sets the flag to OFF.

The basic I/O program 202a receives an I/O request command from the host 2 and executes a data read I/O or write I/O. Upon executing a read I/O or write I/O, the basic I/O program 202a calls, as necessary, the request transmission program 207a, the SM access program 208a, the DMA access program 209a, the HOST_IF access program 210a, and the DRIVE_IF access program 211a, and the like, and executes each program.

The timer synchronization program 203a serves to synchronize the timer of the internal system controller 100a with the timer of the external system controller 100b. Among the plurality of controllers, the timer of one controller is treated as the master, and the timer of the other controller is treated as the slave. The timer synchronization program of the controller treated as the master is placed in a non-operational mode.

The proxy access program 204a is a program enabling the MPU 101a of the internal system controller 100a to access any one or more of the memory 102a, the interfaces 104a and 105a, and the DMA 103a instead of the MPU 101b on the basis of the request information (command or the like) which is transmitted from the MPU 101b of the external system controller.

The request transmission program 207a issues a request to or via the MPU 101b of the external system controller 101a for access to enable the configuration management program 201a or basic I/O program 202a to read or write to the SM12b and the cache memory 13b of the MPU memory 102b of the external system controller 100b and to start up the interfaces 104b and 105b and the DMA 103b. This request is achieved as a result of the processor 101a writing request information (commands and the like) in the communication area 14b of the MPU memory 102b of the external system controller via the bridge 108 and the MPU 101b of the external system controller executing this command. As described earlier, the communication area 14a(14b) comprises the interrupt communication area 141a (141b) where request information for interrupt processing is recorded and the normal communication area 142a(142b) where commands information for normal processing other than interrupt processing are recorded.

The interrupt communication area 141a records request information requesting prioritized processing by the external system controller 100b and the normal communication area 142a records commands requesting nonprioritized processing by the external system controller. The configuration management program 201a and the basic I/O program 202a of the CTLa write processing, which is desirably rapidly handled by the MPU 101b of the CTLb, in the interrupt communication area 141a, and issue an interrupt signal to the CTLb so as to compensate for the disadvantage that a dedicated LSI is not used in communications between processors. The MPU 101b of the CTLb executes commands which are stored in the interrupt communication area 141b and the normal communication area 142b by executing the proxy access program 204b and responds to the MPU 101a which issued the command request with read information of the memory (12b, 13b) and data transfer completion information and the like resulting from execution of the command.

The request transmission program 207a of the MPU 101a limits the categories and attributes and so on of the request information (commands) to be stored in the interrupt communication area 141b to the range required for the prioritized processing. Supposing that a wide variety of request information is all stored in the interrupt communication area 141b, the MPU 101b must prioritize the processing of a large number of commands for the external system controller, and the MPU 101b must essentially perform the processing, while the processing of I/Os from the host in the internal system controller, or the like, is delayed.

Therefore, the nature of the request information for which processing is prioritized by the external system controller will be described. If the processor of the first controller asks the processor of the second controller to reference the foregoing shared information, the processor of the first controller should not move on to the next processing until the shared information is obtained from the processor of the second controller. For example, if the processor of the first controller is unable to acquire shared information from the second controller, the processor of the first controller is unable to access the correct volume of the drive unit 109, and is unable to perform I/O processing correctly. A case where the first controller copies update information of its own shared information to the external system controller is also desirably completed rapidly. That is, access to the shared information must be completed in a very short time and there must be a response to the request-source processor from the request-destination processor. Therefore, the present invention assumes a preferred example of request information for which processing is prioritized where access is made to the shared memory of the external system controller.

Request information for which processing need not be prioritized will be described next. For example, the internal system controller requests a data transfer to the external system controller or reviews the data transfer request. Even when the processing will likely take a long time due to the transfer of data of a large data transfer size, the startup of the data transfer hardware of the external system controller must be prioritized through access to the shared information.

In other words, a short response time by the processor of the external system controller is not required. This is because, in addition to the fact that the shared information is different and that the effect of not prioritizing the processing is small, the controller is able to process the host I/Os via parallel multiplexing, and therefore, after the processor has issued a request to the processor of the external system controller to start up hardware resources for a data transfer due to processing of a certain host I/O command, the processor moves to the processing of another host I/O command without waiting for a response from the processor of the external system controller. There is no need to shorten the response time for a data transfer startup of this kind and this processing is treated as normal processing (nonprioritized processing) rather than prioritized processing.

Therefore, a distinction is made of whether the processor of the first controller should prioritize the processing of information to be requested from the processor of the second controller or not prioritize this processing, meaning that the request information is transmitted to the prioritized processing unit of the second controller only in the former case, and the request information is transmitted to the normal processing unit of the second controller in the latter case. The processor of the second controller prioritizes the processing of the request information in the prioritized processing unit and processes the request information in the normal processing unit normally.

The first embodiment adopts interrupt processing as means for effecting the prioritized processing. The processor 101b of the second controller 100b differentiates between prioritizing processing of the request information from the first controller 100a or processing the request information normally without prioritization depending on whether the request information sent from the processor 101a of the first controller 100a is written to the interrupt communication area 141b or written to the normal communication area 142b. For a command which is written to the normal communication area 142b, the processor 101b of the second controller polls the normal communication area 142b at regular intervals, and when request information which is a normal processing target is found in the normal communication area 142b, the processor 101b processes the command by detecting a certain interval such as after the host I/O processing is complete or during the processing.

The interrupt reception program 205a in FIG. 3 is a program which is called up and started when an interrupt request is received from the external system controller 100b and which receives commands in the interrupt communication area 141a and hands the commands over to the proxy access program 204a, and the normal reception program 206a is a program which is started during the aforementioned poling and which, if there is a command in the normal communication area 142a, receives and hands over the command to the proxy access program 204a.

The programs call up, where necessary, the SM access program 208, the DMA access program 209, the HOST_IF access program 210, and the DRIVE_IF access program 211, and the like, and starts some or all of these programs.

The SM access program 208a is a program which is called up when the configuration management program 201a and basic I/O program 202a require the shared information of the SM 12a and which enables execution of processing for referencing and updating the control information of the SM 12a.

The DMA access program 209a is a program which starts up the DMA 103a and performs data transfers of user data which is stored in the cache memory 13a.

The HOST_IF access program 210a is a program for accessing the HOST_IF 105a and transmitting and receiving commands and data to and from the host 2.

The DRIVE_IF access program 211a is a program for accessing the DRIVE_IF 105a and transmitting and receiving commands and data to and from the drive 109D.

These access programs are called up by the basic I/O program and the like together with access request information which includes information such as numbers identifying access target hardware, access types (read/write/data transfers and so on), memory addresses where target data exists, and memory addresses storing result information such as success/failure and read values and the like when hardware processing is complete. The access programs each execute access to the hardware specified by the basic I/O program according to the designated access type.

The DRIVE_IF access program 211a is called up by the basic I/O program 202a together with access request information accompanied by management information such as the DRIVE_IF number for identifying the DRIVE_IF 105a, the access type such as read/write, the address of the transfer data storage area (cache memory, drive unit), and the response storage destination address (SM address). The DRIVE_IF access program 211a thus called up starts up the DRIVE_IF 105 designated by the DRIVE_IF number on the basis of information such as the access type and data transfer destination address and ends. The started up DRIVE_IF 105a transfers the data in the designated cache memory 13a to the drive unit 109 or transfers designated data in the drive unit 109 to the designated data storage cache area. In addition, the DRIVE_IF 105a writes completion status information indicating whether the transfer has been completed normally to the designated response storage destination area (communication area 14a) in the MPU memory 101a.

The HOST_IF access program 210a is called up by the basic I/O program 202a together with access request information accompanied by management information such as the HOST_IF number for identifying the HOST_IF 104a, the access type such as read/write, the address of the transfer data storage area (cache memory, drive unit), and the response storage destination address (SM address). The HOST_IF access program which is called up starts up the HOST_IF designated by the HOST_IF number on the basis of information such as the access type and the data transfer destination address and ends. The started up HOST_IF transfers the data in the designated area of the cache memory 13 to the host or transfers data from the host to the designated area in the cache memory. In addition, the DRIVE_IF 105a writes completion status information indicating whether the transfer has been completed normally to the designated response storage destination area (communication area 14a) in the MPU memory 101a.

The request to start up being received by DMA access program contains information such as the identification number of the DMA being started up, information on the controller to which the data transfer source/transfer destination cache memory belongs, the memory address, and the response storage destination address (SM communication area) for storing status information relating to DMA data transfer completion.

The SM access program 208a performs read/write/atomic access and so on, according to the request type specified by the caller program, to the SM 12a of the MPU memory 101a. Further, the SM access program 208a writes the access result to a result return area of the communication area.

Figure 4:
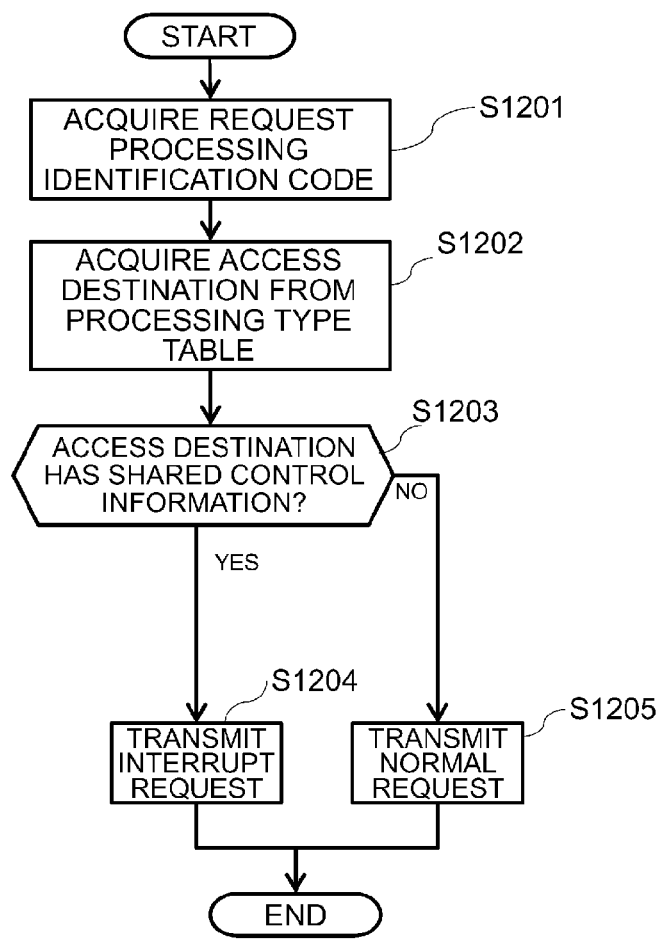
FIG. 4 is an example of a process flow of a request transmission program.

FIG. 4 is a process flow of the request transmission program 207. The request transmission program 207 is called up by the caller program such as the basic I/O program 202 or the configuration information management program 201 together with request information including identification information showing the hardware of the external system controller for which proxy access is to be requested, the request content (startup of reading, writing, data transfer and so on), and, if necessary, the address of the read target memory and the like, the address of the MPU memory 101a of the internal system controller for storing the return value from the hardware of the external system controller or the access program, and the accompanying parameters.

First, the request transmission program 207a acquires an identification code for identifying request processing information from the request information supplied from the caller program (step S1201). The request transmission program 207a then references the request processing identification table 111a (FIG. 10: details provided subsequently), and acquires information on the hardware resources of the external system controller which is the access destination according to the identification code (step S1202). The request transmission program 207a moves to step SP1203 and determines whether the access destination hardware comprises the foregoing shared information. More specifically, the request transmission program 207a references the access destination attribute table 112 (FIG. 12 details provided subsequently), and if Yes is stored in the shared information field which corresponds to the access destination hardware, the request transmission program 207a determines that the access to the access destination hardware of the external system controller 100b is access to shared information. Upon obtaining an affirmative result, the request transmission program 207a transmits request information to the interrupt communication area 141b of the MPU memory 102b of the external system controller 100b (S1204).

At the time of the access request, the request transmission program 207a writes the request information to the interrupt communication area 141b of the communication area 14b of the MPU memory 102b of the external system controller and then transmits an interrupt signal (a PCI-express MSI packet, for example) to the MPU 101b of the external system controller via the intercontroller connection bus 108.

Meanwhile, when step S1203 yields a negative result and it is determined that the access to the external system controller is not access to shared information, the request transmission program 207a need not perform interrupt processing on the request destination hardware of the external system controller 100b and transmits the request information to the normal communication area 142b of the MPU memory 102b of the external system controller 100b (S1205).

Figure 5:
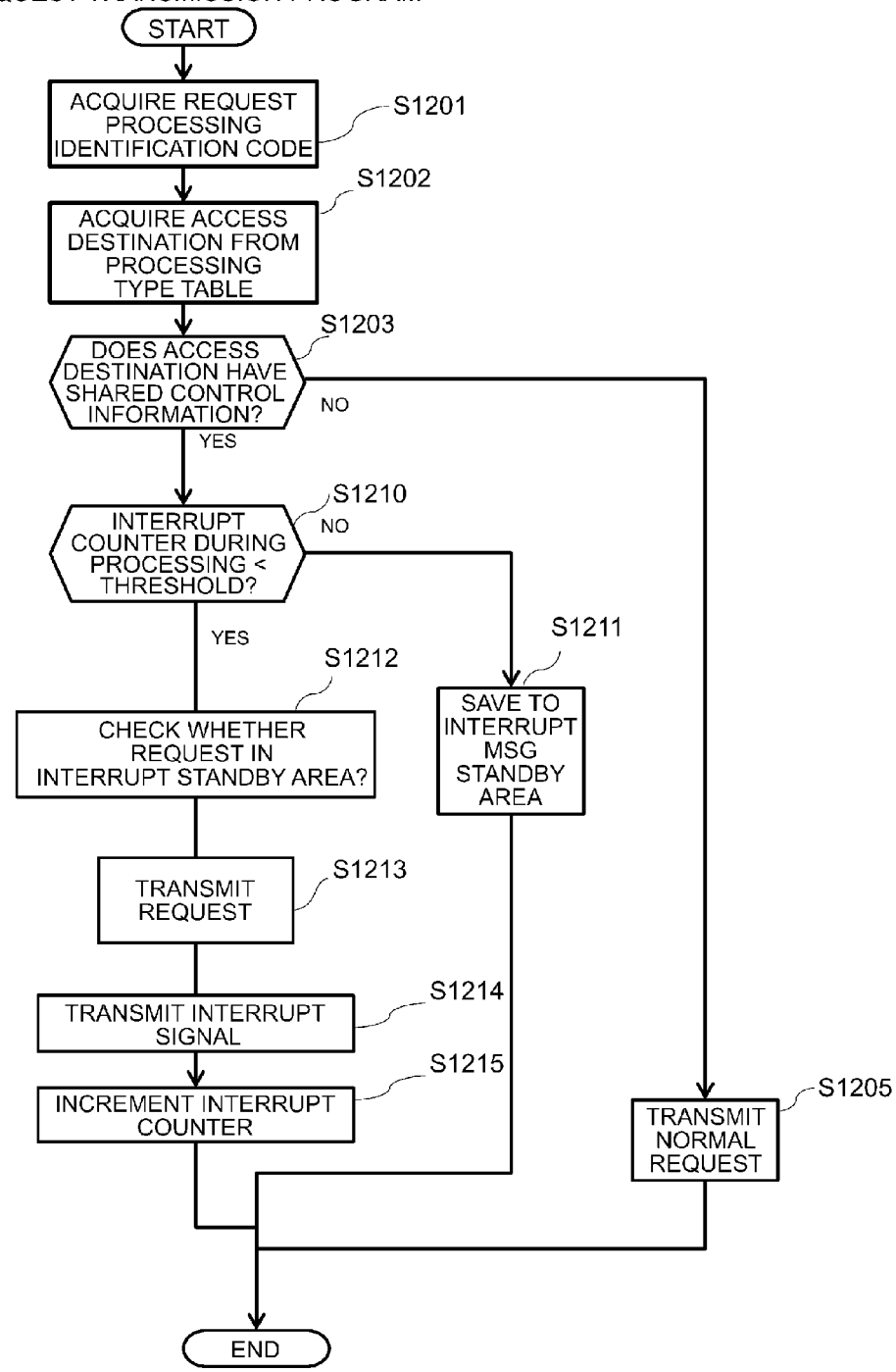
FIG. 5 is a flowchart showing another aspect of the request transmission program.

FIG. 5 is a flowchart serving to illustrate another embodiment of the request transmission program 207. This flowchart differs from the flowchart of FIG. 4 in that step S1204 of FIG. 4 is replaced by steps S1210 to S1214. When the request transmission program 207a determines that the access destination of the caller program is shared information which is recorded in the access destination (SM 12b and the like) of the external system controller 101b, the request transmission program 207a increments the counter which updates and records the number of incomplete interrupt processing among the interrupt processing requests to the external system controller 100b. The request transmission program 207a increment the counter by 1 at the stage where the interrupt signal is to be transmitted and decrement the counter by 1 at the moment when a response signal is sent back by the external system controller. The controller includes the counter in the local memory 11 of the MPU memory 102 of the internal system controller.

The request transmission program 207a determines whether the value of the current counter is less than a threshold in step S1210 (S1210), and if the value is equal to or greater than the threshold (S1210: No), the request transmission program 207a does not make an interrupt processing request to the MPU 102b of the external system controller 100b and records a request in the interrupt standby area of the MPU memory 102a of the internal system controller 100a, thus ending the [processing of the] flowchart (step S1211).

When it is determined that the counter is less than the threshold (S1212: Yes), the request transmission program 207a checks whether there is a request recorded in the interrupt standby area (S1212), and if there is request information in the interrupt standby area, the request transmission program 207a combines the standby request information with the current request information determined by the S1203 and transmits same to the interrupt communication area 141b of the external system controller (S1214), and transmits an interrupt signal for the plurality of request information to the external system controller 100b (S1214). The request transmission program 207a increments the request information count counter (step S1215). Meanwhile, when the request transmission program determines that there is no standby request information, the request transmission program 207a transmits the current request information (S1213), transmits an interrupt signal for the current request information (S1214), and increment the counter by 1 (S1215).

With this flowchart, because the request transmission program 207a collects interrupt requests, it is possible to avoid continuously issuing a large number of request information transmissions which are interrupt processing targets to the request destination controller 100b and to reduce overheads based on frequent switching of processes which are called up on the basis of the request information by the request destination controller 100b.

Figure 6:
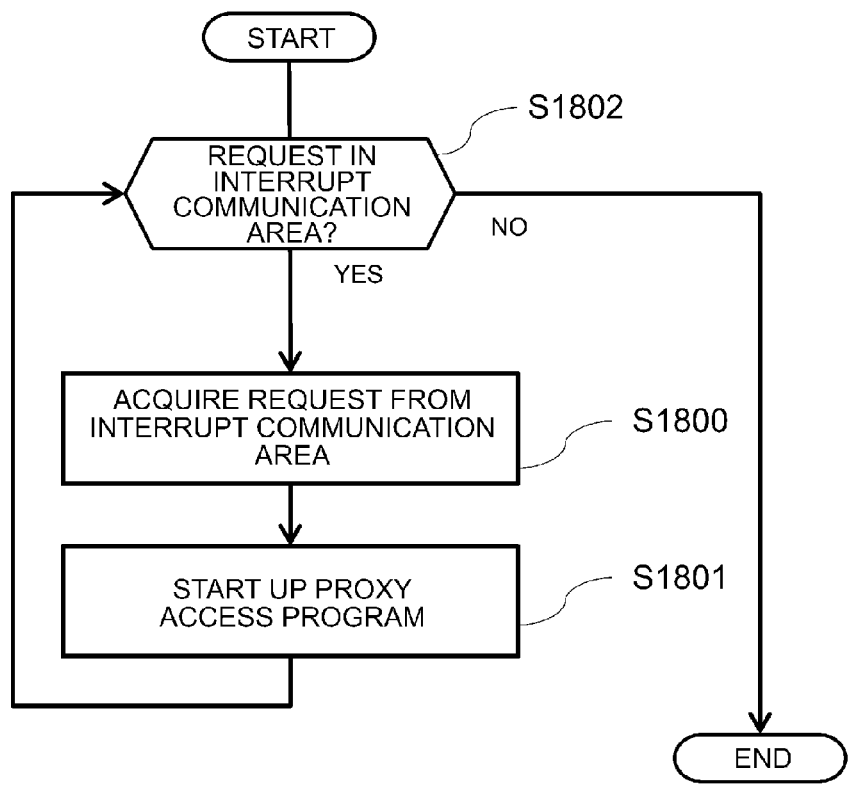
FIG. 6 is an example of a process flow of an interrupt reception program.

FIG. 6 shows a process flow for the interrupt reception program 205. The interrupt reception program 205 is executed upon suspending the processing being executed at the moment when the MPU 101b receives the interrupt signal from the external system controller 101a. At the time the processing being executed is suspended, the program counter and local variables and so on are recorded and the interrupt processing ends, whereupon the suspended program is restarted. This arrangement is a typically a function of an OS (operating system).

First, the interrupt reception program 205a checks whether request information (a request) is recorded in the interrupt communication area 141a (S1802) and if there is a request, the interrupt reception program 205a acquires request information from the interrupt communication area 141a (S1800), and accordingly starts the proxy access program 204a (S1801) and returns to step S1802. If there is no request (S1802: No), [the processing of] the flowchart is ended.

Figure 7:
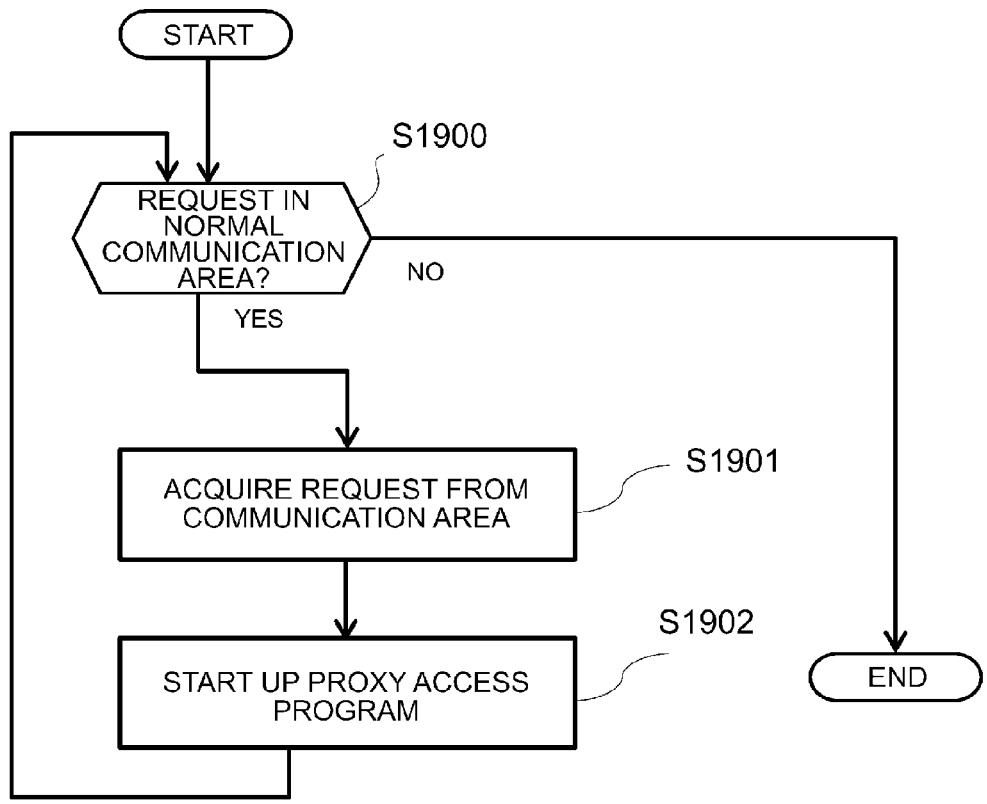
FIG. 7 is an example of a process flow of a normal reception program.

FIG. 7 shows the process flow of the normal reception program 206. The normal reception program 206 is called up at regular intervals to the MPU 101 but is not executed upon suspending host command processing such as I/O processing. Hence, although the normal reception program does not generate overheads in the processing being executed, unlike interrupt processing, processing may take a long time after a request is received. The normal reception program 206a first checks whether the request information is stored in the normal communication area 142a (S1900) and if not, ends the processing. If request information is stored, the normal reception program 206a acquires request information from the normal communication area 142a (step S1901) and starts the proxy access program 204a (1902). When startup of the proxy access program 204a ends, the processing returns to step S1900.

Figure 8:
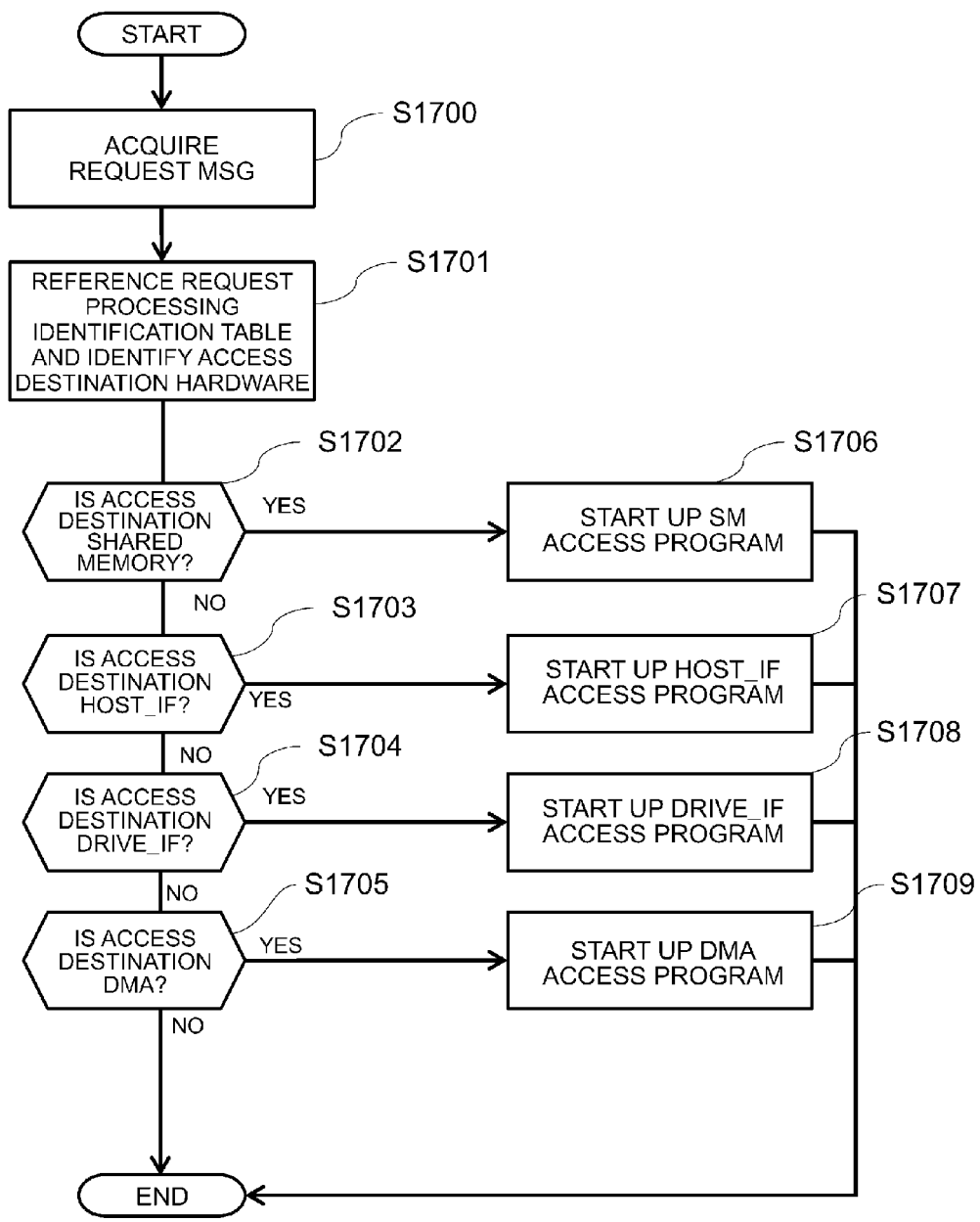
FIG. 8 is an example of a process flow of a proxy access program.

FIG. 8 shows a flowchart for the proxy access program 204. The proxy access program 204a is started by the interrupt reception program 205a or the normal communication program 206a. The proxy access program 204a acquires request information via the interrupt communication program 205a or normal communication program 206a (step S1700). The proxy access program 204a then references the request processing identification table 111 (FIG. 10) to identify the access destination hardware of the external system controller based on the identification code which is contained in the request information (step S1701). Further, in steps S1702 to S1709, the proxy access program 204a discriminates the access destination hardware and starts the access program for each access destination hardware.

Figure 9:
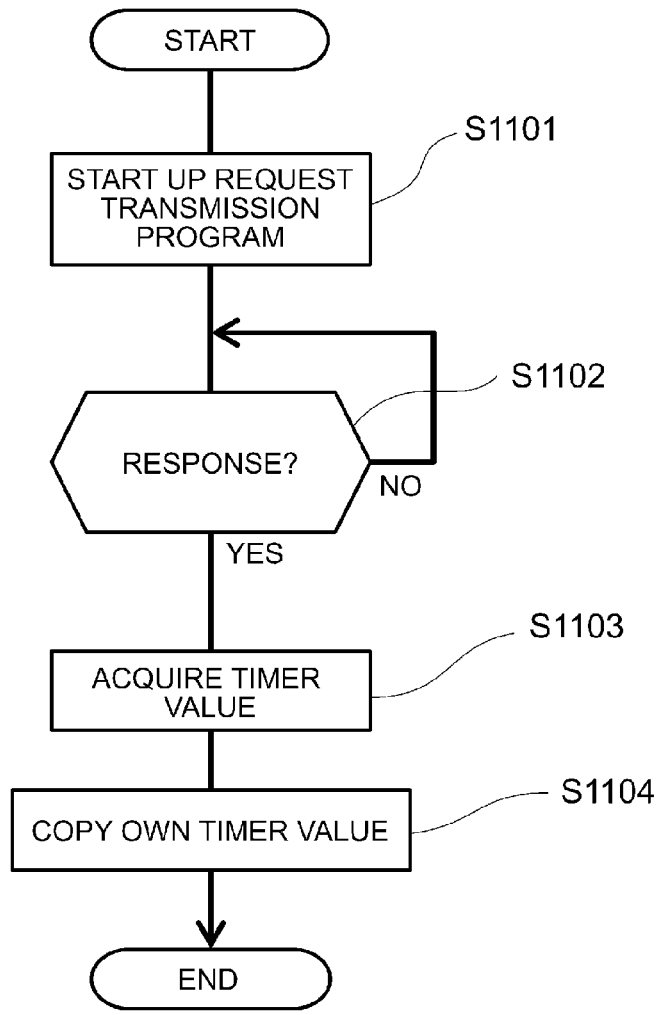
FIG. 9 is an example of a process flow of a timer synchronization program.

FIG. 9 is a process flow for the timer synchronization program 203. The timer information is one of the shared information which is to be shared by the plurality of controllers. The timer synchronization processing is processing for synchronizing the MPU internal timers of the plurality of controllers. The timer synchronization program 203a is called up at fixed intervals by the internal system controller 100a and acquires the value of the MPU internal timer of the external system controller 100b and copies the value read to the MPU internal timer of the internal system controller 100a. In this case, the timer of the external system controller is treated as the master.

The timer synchronization program 203a starts the request transmission program 207a and records the timer read request information in the interrupt communication area 141b of the external system controller (S1101). The MPU 101b of the external system controller acquires request information by means of the interrupt reception program 205b and reads the internal timer value of the MPU 101b by means of the proxy access program 204a. The MPU 101b executes the request transmission program 207a and stores the read information in the interrupt communication area 141a of the controller 100a as a response to the request information. The MPU 101a executes the interrupt reception program 205a and receives the timer value of the interrupt communication area 141a, and the proxy access program 204a accesses the internal timer of the MPU 101a and copies the read timer value. Thus, the timer synchronization program waits in a busy loop until there is a response from the external system controller (S1102), and if a response is received, acquires the timer value from the response information (S1103) and copies the timer value to the MPU internal timer of the internal system controller (S1104), thus ending [the processing of] the flowchart.

The control and management tables which are used by one or two or more of the proxy access program, the interrupt reception program, the normal reception program, and the request transmission program will be described next. The control and management tables include the foregoing internal/external system determination table 110, the request processing identification table 111, and the access destination attribute table 112 (see FIG. 2).

FIG. 10 shows a configuration example of the request processing identification table 111. The request identification table 111 is a table for identifying the communication type and access destination in accordance with the identification code. Each entry comprises an identification code field 1110, a communication type field 1111, and an access destination field 1112. The request transmission program 207 determines the communication type 1111 and determines the access destination 1112 on the basis of a command from the configuration management program 201 or the basic I/O program 202.

The request transmission program 207 determines the identification code on the basis of these determination items. The request transmission program 207a makes the decision regarding which of the interrupt communication area 141b and the normal communication area 142b of the communication area 14b of the external system controller 100b the request transmission program 207a is to write the identification code to according to the access destination. If the access destination is shared information or timer information, the identification code is written to the interrupt communication area 141b, otherwise the identification code is written to the normal communication area 142b.

FIG. 11 shows a configuration example of an access destination attribute table 112. The access destination attribute table 112 is a table indicating whether each access destination stores shared information. Each entry comprises an access destination field 1120 and a shared information field 1121. The shared memory (SM) 12 comprises shared information and the timer also comprises shared information but other access destinations do not comprise shared information.

In order to determine which of the interrupt communication area 141b and the normal communication area 142b of the communication area 14b of the external system controller 110b to write the identification code to, the request transmission program 207 references the access destination attribute table 112 to determine that the access destination comprises shared information (Yes) and the request transmission program 207a stores the identification code in the interrupt communication area 141b. When it is determined that the access destination does not comprise the shared information, the request transmission program 207a stores the identification code in the normal communication area 142b.

Figure 12:
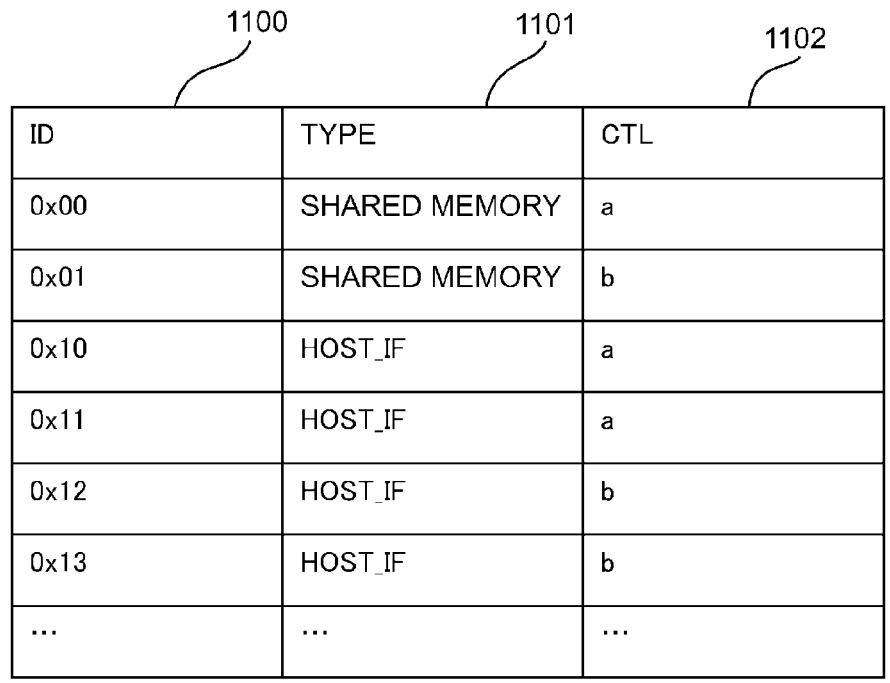
FIG. 12 is a configuration example of an internal/external system determination table.

FIG. 12 shows a configuration example of the internal/external system determination table 110. The internal/external system determination table 110 shows the access destination type and whether the access destination is the CTLa or CTLb on the basis of the foregoing identification code (ID). Each entry comprises an ID field 1100, a type field 1101, and a CTL field 1102. The request transmission program 207a stores an identification code in the communication area 14b of the external system controller if the registration information in the CTL field is "b" (external system controller) and, upon detecting that the registration information in the CTL field is "a", because the access destination of the configuration management program 201a or the basic program 202a is a resource in its own controller, the program does not need to store identification information in the communication area 14b of the external system controller 100b and executes processing, which corresponds to the communication type, on the access destination hardware resources of the request processing identification table 111.

Figure 13:
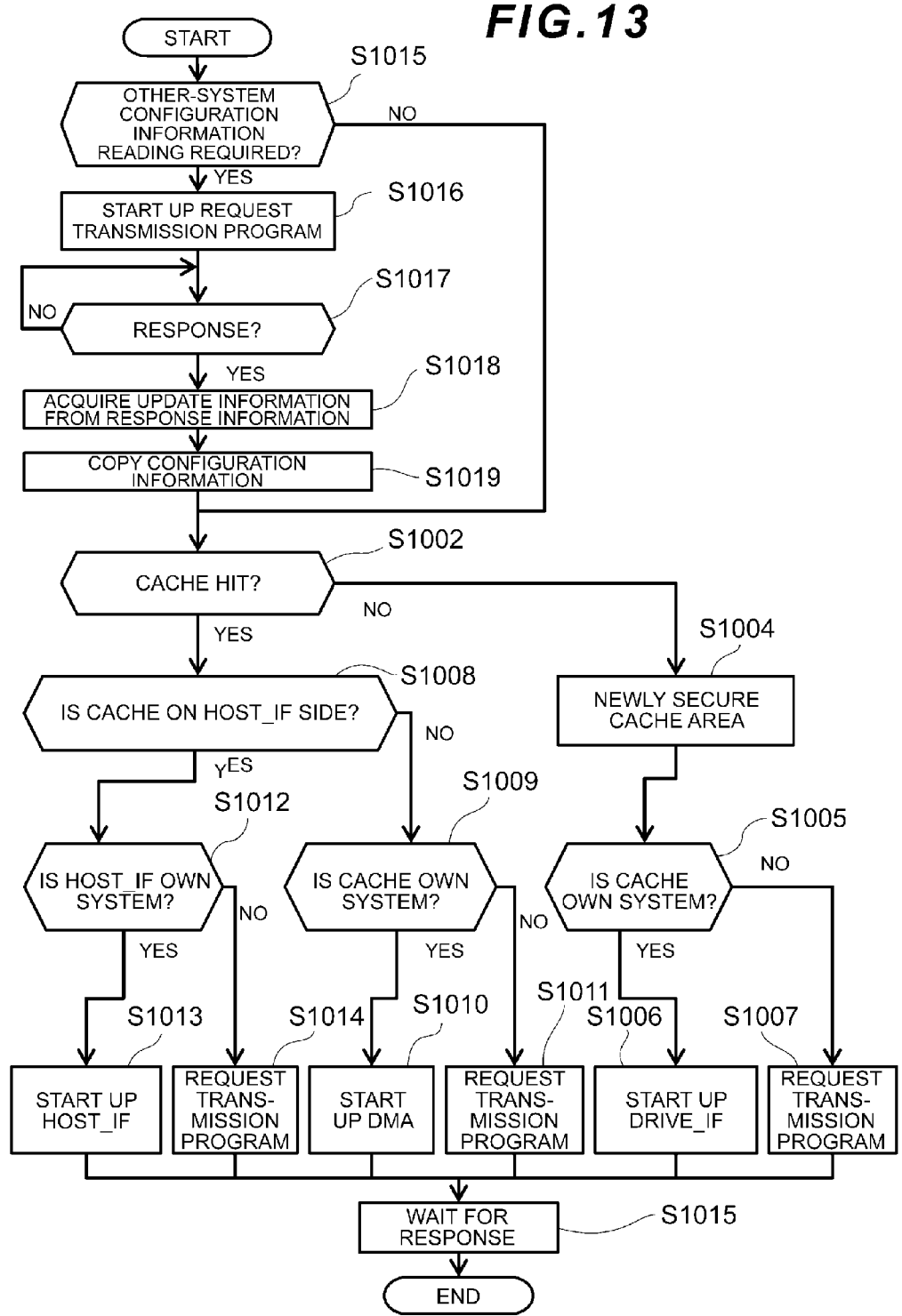
FIG. 13 is a flowchart of read I/O processing by a host 2.

Next, while describing the processing of read I/Os from the host 2, the operations of the proxy access program 204, the interrupt reception program 205, the normal reception program 206, and the request transmission program 207 will be described on the basis of FIGS. 13 to 16. FIG. 13 is a read I/O processing flowchart. This flow is started when the MPU 101 receives a read I/O command from the host IF 104.

First, the basic I/O command 202 issues an inquiry regarding the presence of a configuration information update to the configuration management program 201. The configuration management program 201a accesses the communication area 14a and checks whether a configuration information updated flag has been set. Upon detecting that a configuration information updated flag for the external system controller 100b has been set, because the latest shared information must be read from the external system controller (S1015: Yes), the configuration management program 201a starts the request transmission program 207a (S1016).

When the request transmission program 207a is started, an identification code (0x00) is written to the interrupt communication area 141b of the communication area 14b of the external system controller 100b and an interrupt signal is transmitted to the external system controller 100b. The identification code (0x00) is a command requesting that the MPU 101b of the external system controller 100b access the shared memory 12b to read updated shared information from the shared memory 12b. The request transmission program 207a waits in a busy loop for a response from the external system controller 100b (S1017). Note that processing of a response from the external system controller 100b by the internal system controller 100a may be prioritized as mentioned earlier.

Upon receiving an interrupt signal from the internal system controller 100a, the MPU 101b of the external system controller 100b starts the interrupt reception program 205b, and the interrupt reception program 205b reads the identification code in the interrupt communication area 141b and hands over the identification code to the proxy access program 204b. The proxy access program 204b references the request processing identification table 111b on the basis of the identification code and accesses the SM 12b upon determining that the access destination is the SM12b.

Further, the proxy access program 204a reads the updated shared information and the basic I/O program 202a of the internal system controller, which transmits a response containing the shared information to the internal system controller 100a via the request transmission program 207b, acquires the updated shared information from the response information (S1018), and copies the update information to the shared memory 12a via the configuration management program 201a (S1019). Thus, when the basic I/O program 202a executes processing of read I/Os from the host 2, because a check is to be made for the presence of an update to the configuration information which is to be shared by both controllers in a storage system with a dual controller configuration, even when a configuration information update is effected in one controller, this update can be rapidly copied to the external system controller. Note that, when the configuration management program 201a checks the communication area 14a in S1015, if a configuration information update flag has not been set, steps S1016 to S1019 may be skipped.

The basic I/O program 202a references the shared information of the SM 12a (the cache index of the cache memory 13a of the internal system controller 100a and the cache index of the cache memory 13b of the external system controller 100b) and performs a cache hit/miss determination (S1002), and in the event of a cache hit, advances to S1008.

In the event of a cache miss, the basic I/O program 202a advances to step S1004. In S1004, in order to secure a new cache area, for staging the read data from the drive unit 109, in the cache memory 13a of the internal system controller 100a or the cache memory 13b of the external system controller 100b, the basic I/O program 202a updates the respective cache memory configuration information. When the information relating to securing the cache area is copied to the SMa of the internal system controller 100a, the configuration management program 201a sets a flag to the effect that update information has been updated in the interrupt communication area 141b of the communication area 14b of the external system controller 100b by means of the request transmission program 207a. The MPU 101b of the external system controller 100b prioritizes processing of the flag and writes a request for reading the cache configuration information of the SM 12a in the interrupt communication area 141a of the internal system controller 100a.

Thereafter, upon determining that a cache area has been secured in the internal system cache memory, the basic I/O program 202a starts up the DRIVE_IF 105a of the internal system controller 100a, that is, starts up the DRIVE_IF access program 211a (S1006). If the secured cache area is in the cache memory 13a of the external system controller 100b, the basic I/O program 202a starts the request transmission program 207a and writes a request to start up the DRIVE_IF 105b in the normal communication area 142b of the external system controller. The MPU 101b of the external system controller 100b executes the proxy access program 204a, starts the DRIVE_IF access program 211b and then starts up the DRIVE_IF 105b.

Meanwhile, if the basic I/O program 202a determines a cache hit (S1002: Yes), the basic I/O program 202a references the shared information in the SM 12a in step S1008 and determines whether the cache memory 13 which comprises the read data is in the same controller as the HOST_IF 104 which received the read I/O from the host (S1008). When a negative determination is made, the basic I/O program 202a determines whether the cache memory which comprises the read data is in the controller which is to be process the read I/O (this is the internal system controller 100a in the case of FIG. 13) (S1009), and upon determining that the cache memory 13 belongs to the internal system controller 100a, the basic I/O program 202a starts the DMA access program 209a of the internal system controller 100a and starts up the DMA 103a (S1010). The DMA 209a transfers the read data of the cache memory to the HOST_IF 104a.

However, when it is determined that the cache memory is in the external system controller 100b, the basic I/O program 202a starts the request transmission program 207a in order to issue a request to the external system controller to start up the DMA 109b (S1011).

In step S1008, the basic I/O program 202a references the configuration information in the SM 12a of the internal system controller 100a, and when it is determined that the cache memory which comprises read data is in the same controller as the HOST_IF 104 which received the read I/O from the host 2, the basic I/O program 202a determines whether the HOST_IF is in the internal system controller 100a. When it is determined that the HOST_IF is in the internal system controller 100a, the basic I/O program starts the HOST_IF access program 210a and starts up the HOST_IF 104a (step S1013).

When it is determined that the HOST_IF is in the external system controller 100b (S1008: Yes), the basic I/O program starts the request transmission program 207a in order to request the startup of the HOST_IF access program 210b of the external system controller 100b (step S1014).

The basic I/O program advances to S1015 via the steps S1013, S1014, S1010, S1011, S1006, and S1007. In S1015, the basic I/O program 202a sets the response standby state from the foregoing started up program and temporarily ends [the processing of] the flowchart in FIG. 13. Upon recognizing a response from the startup target program, the basic I/O program 202a restarts [the processing of] the flowchart in FIG. 13 in order to continue the read I/O command processing.

Figure 14:
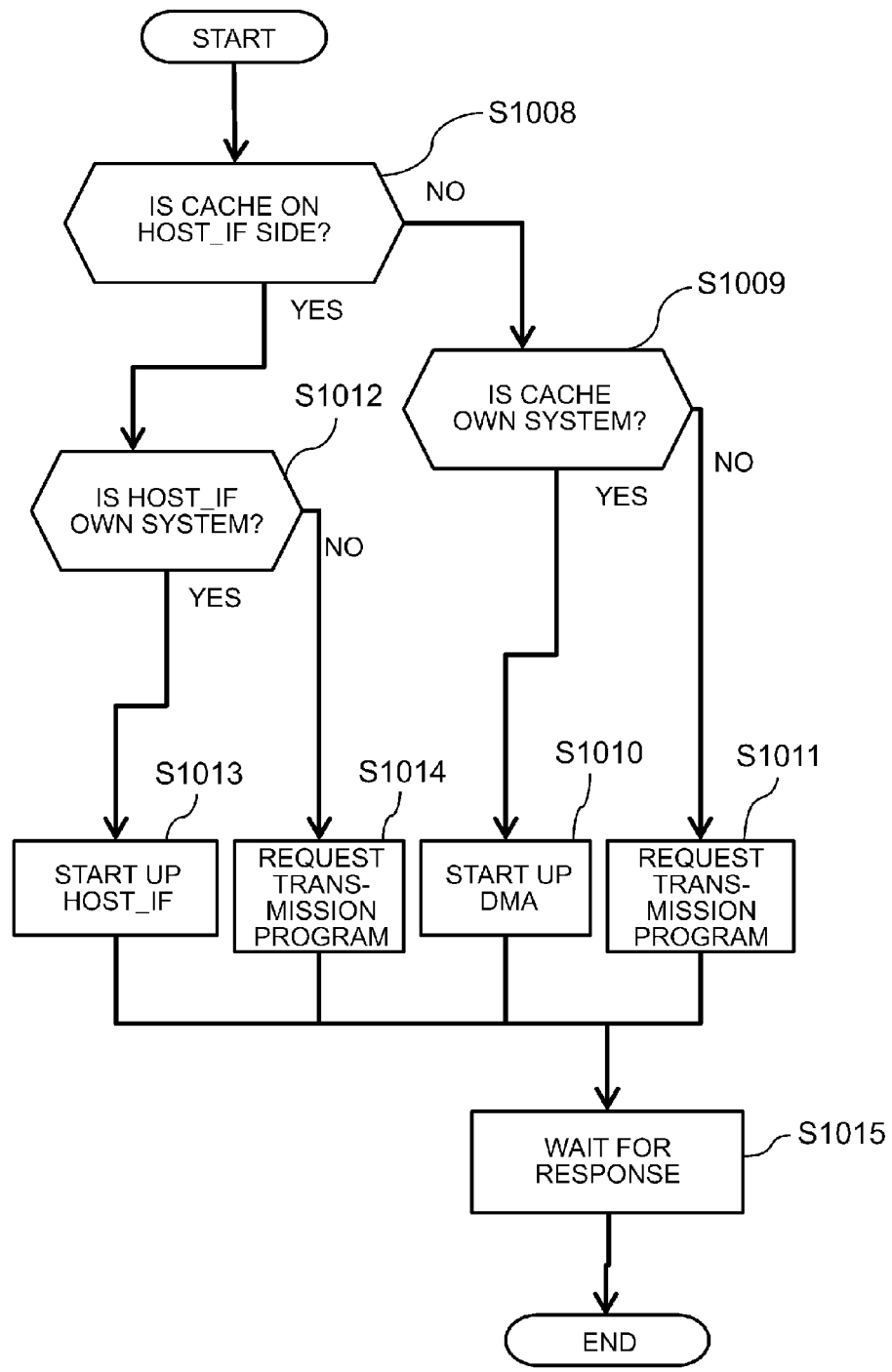
FIG. 14 describes in detail part of the flowchart of FIG. 13.

Upon recognizing the response to the startup request in S1006 or S1007 of FIG. 13, the basic I/O program 202a restarts [the processing of] the flowchart in FIG. 13. The flow after restart is as shown in the flowchart of FIG. 14. In a state where there is a response from the startup target program (S1006 or S1007), a new cache area is secured in the internal system controller 100a or the external system controller 100b. Further, the read data is staged from the drive unit 109 into the newly secured cache area. Therefore, the basic I/O program 202a determines an affirmative result in S1002, and executes S1008 and subsequent steps. The description of each step in FIG. 14 is the same as that for FIG. 13.

Figure 15:
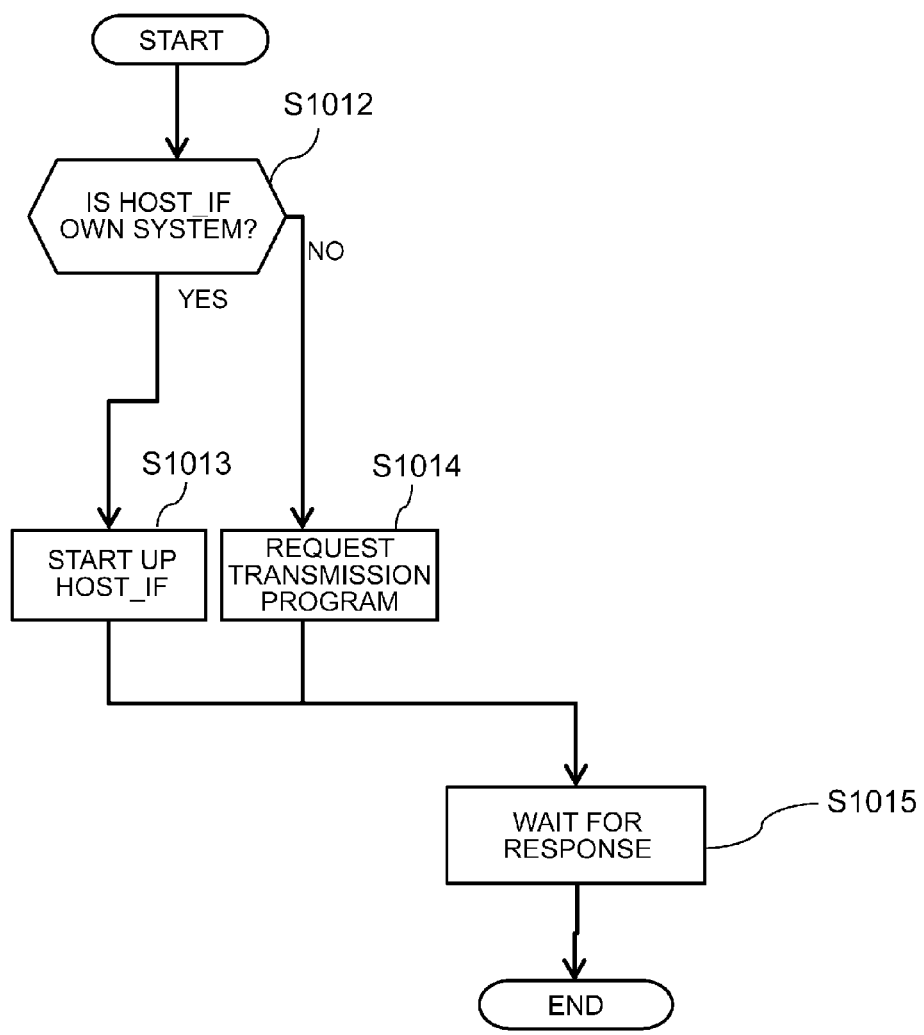
FIG. 15 describes in detail part of the flowchart of FIG. 13.

When the basic I/O program 202a receives a response from the program which is a startup target due to S1013 or S1014, a state is assumed where the read target data can be transferred from the cache memory 13 to the HOST_IF 104 by the DMA 103 in the internal system controller 100a and the external system controller 100b. Therefore, in order to enable a read data transfer to the host, the basic I/O program must start up the host_IF access program 210. For this reason, upon receiving a response from a startup target program due to S1013 or S1014, the basic I/O program 202a executes the processing of S1012 and subsequent steps of FIG. 13 as shown in FIG. 15. The processing of S1012 of FIG. 15 and subsequent steps is the same as that of FIG. 13.

Upon receiving a response from the HOST_IF access program 210a of the internal system controller 100a which is the startup target in S1013 or receiving a response from the HOST_IF access program 210b of the external system controller 100b which is the startup target in S1014 (FIG. 15: S1015), the read data is transferred from the cache memory 13 to the host 2 which issued the read I/O via the HOST_IF 104, and hence the basic I/O program 202a ends the read I/O processing.

Embodiment 2

Figure 16:
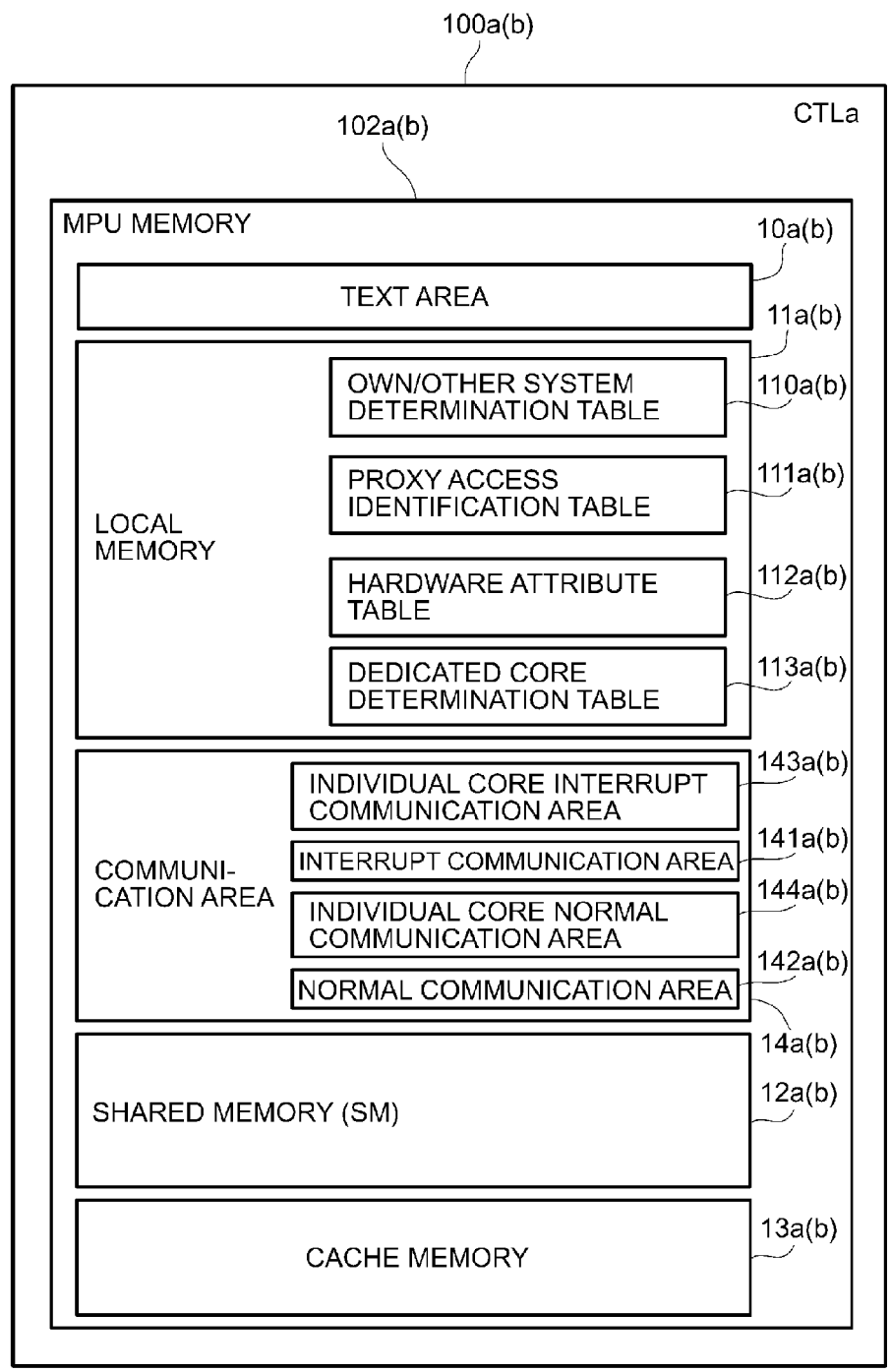
FIG. 16 is a configuration example of an MPU memory according to a second embodiment.

Although the foregoing prioritized processing is realized by interrupt processing in the first embodiment, in the case of the second embodiment, a multicore type processor is adopted as the processor so that the prioritized processing is achieved by configuring some of the cores exclusively for the prioritized processing so that these cores are prevented from performing host I/O processing. FIG. 16 is a configuration of the MPU memory 102a of the second embodiment. The second embodiment differs from the first embodiment in that a table 113a for determining a dedicated core processor among the plurality of core processors is added to the local memory 11a and in that an individual core interrupt communication area 143a and an individual core normal communication area 144a are added to the communication area 14a. The same is also true for the MPU memory 102b of the external system controller 100b.

With the second embodiment, the determination is made of whether any given core is a dedicated core as a result of each core referring to the dedicated core determination table 113a during startup, and the basic I/O program 202a and the configuration management program 201a are executed only if a core is determined to be a normal core rather than a dedicated core.

FIG. 17 shows an example of the dedicated core determination table 113. The dedicated core determination table 113 contains entries in a number which corresponds to the number of cores and each entry comprises a core field 1130, a core type field 1131, and an interrupt receivable/unreceivable field 1132. The core field 1130 stores information for identifying cores, the core type field 1131 stores identification information for distinguishing between a dedicated core and a normal core, and the interrupt receivable/unreceivable field 1132 stores information indicating whether or not a normal core can receive interrupt processing.

As mentioned earlier, a dedicated core specializes in prioritized processing, whereas a normal core is able to execute processing other than prioritized processing, i.e. host I/O processing and processing of management requests from the management terminal 3. The transmission of request information to the normal core and dedicated core uses an individual core communication area. A dedicated core does not require an interrupt request to process requests from the external system controller, and hence the individual core normal communication area 142a is used for a request to a dedicated core. As shown in FIG. 17, a setting is made for a normal core to specify whether or not an interrupt can be received. A normal core which is set to not receive interrupts does not receive interrupt requests from the external system controller, and hence the interrupt communication area is not used for this core. Therefore, the normal core is compatible with the foregoing normal processing and not the foregoing prioritized processing. A normal core which has been set to be able to receive interrupts receives interrupt requests from the external system controller, and hence is compatible with both the prioritized processing and the normal processing.

The dedicated core determination table 113 can be changed dynamically depending on the core type, whether interrupts can be received, and the load on each core. Further, an example is shown in which two processors each comprise four cores and also where each processor has one dedicated core, but this is just an example. The balance of dedicated cores and normal cores is not limited to that described in the table. Switching between dedicated cores and normal cores is made possible by the configuration management program rewriting the dedicated core determination table 113. In the dedicated core determination table, the CTL0 is the MPU 101a of the first controller, and the CTL1 is the MPU101b of the second controller.

Figure 18:
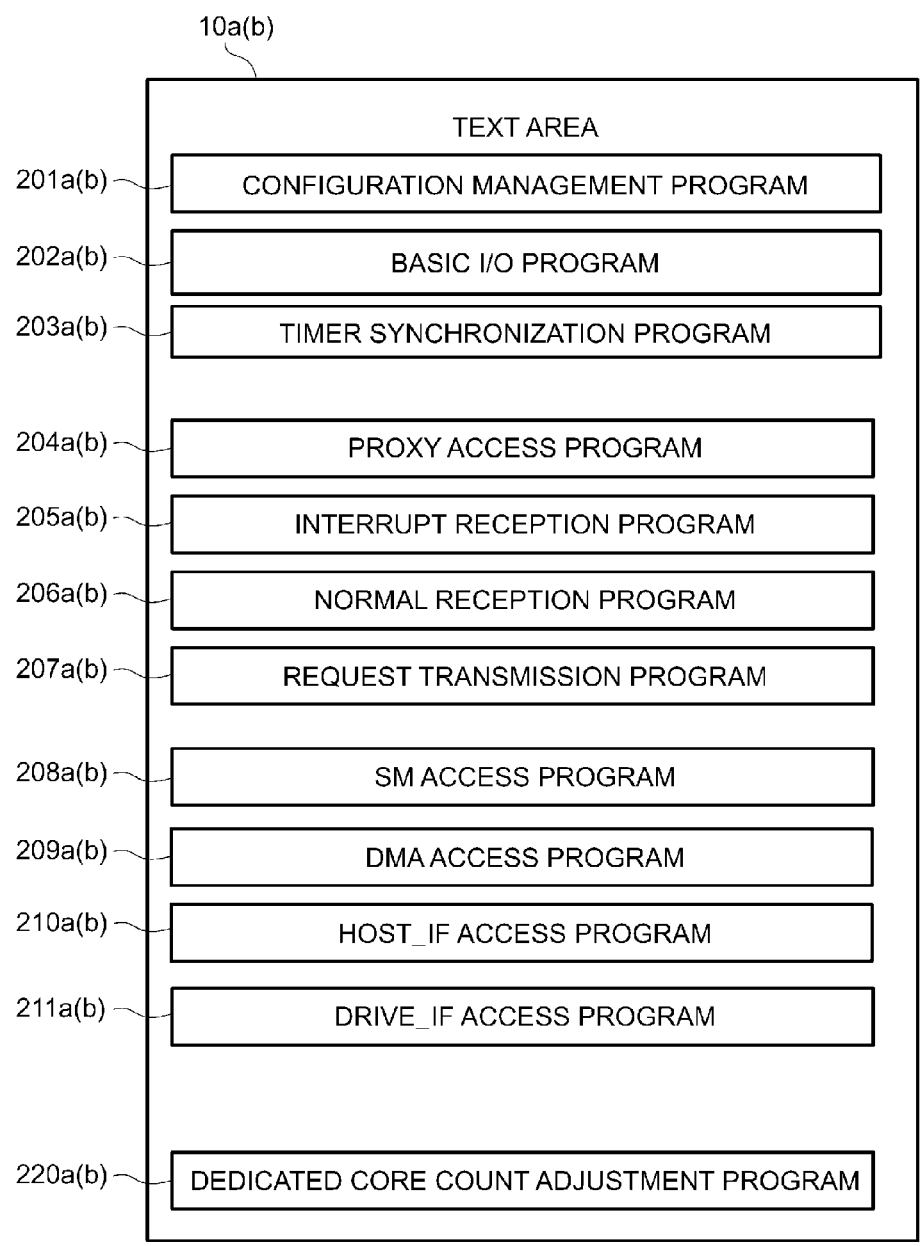
FIG. 18 is a software configuration diagram of the MPU memory according to the second embodiment.

FIG. 18 is a software configuration diagram of the MPU memory 102 according to the second embodiment. Unlike in the first embodiment, a dedicated core count adjustment program 220 has been added. Details on this program will be provided subsequently.

Figure 19:
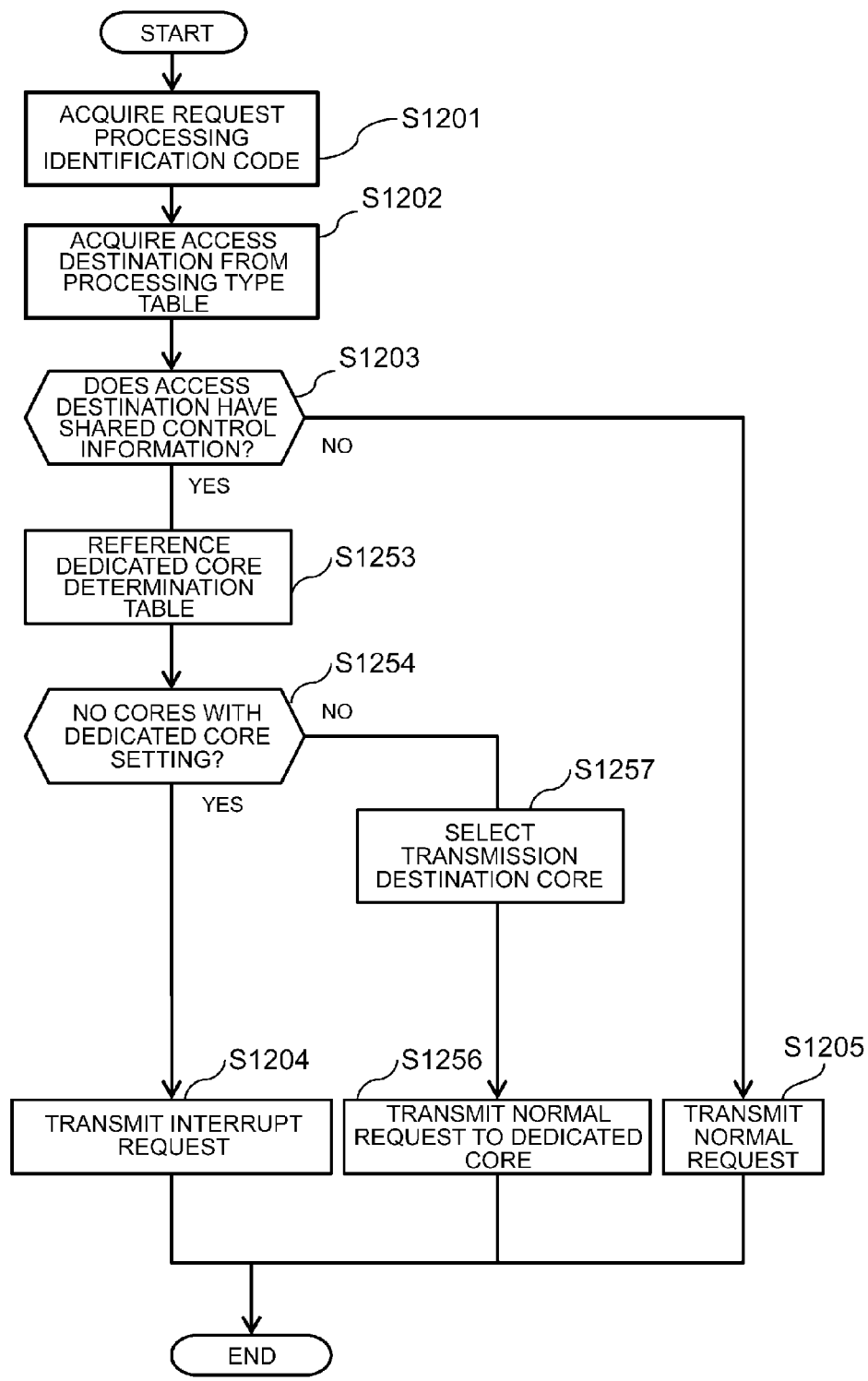
FIG. 19 is an example of a process flow of a request transmission program according to the second embodiment.

FIG. 19 is a process flow for the request transmission program 207a according to the second embodiment. This request transmission program 207a differs from the request transmission program according to the first embodiment (FIG. 4) in that steps S1253 to S1256 have been added between S1203 and S1204. The normal core which received the host I/O (a dedicated core does not receive host I/Os) starts the request transmission program 207. The request transmission program 207a references the dedicated core determination table 113 in S1253 after S1201 to S1203 and determines whether there is at least one dedicated core in the MPU 101b of the external system controller 100b (S1254).

Upon determining that there is no dedicated core in the external system controller, the normal core which executes the request transmission program 207a writes request information in the interrupt communication area 143b of the normal core of the MPU memory 101b in the external system controller and transmits an interrupt request (S1204).

If, on the other hand, the existence of a dedicated core is determined, the request transmission program 207a advances to S1257 and selects one core of the external system controller which has been set as a dedicated core (S1257). If there are a plurality of cores which have been set as dedicated cores, the request transmission program 207a selects any of these cores via a round-robbin or the like, for example. The request transmission program 207a then writes request information in the normal communication area 144b of the selected core in the external system controller 100b (step S1256). The dedicated core does not perform non-prioritized processing such as host I/O processing, and hence is able to respond to the request information transmission source in a short time, which is advantageous in that, in comparison with a case where the prioritized processing is executed by means of interrupt processing, no overhead is generated based on the program which is running having to be switched to interrupt processing.

Figure 20:
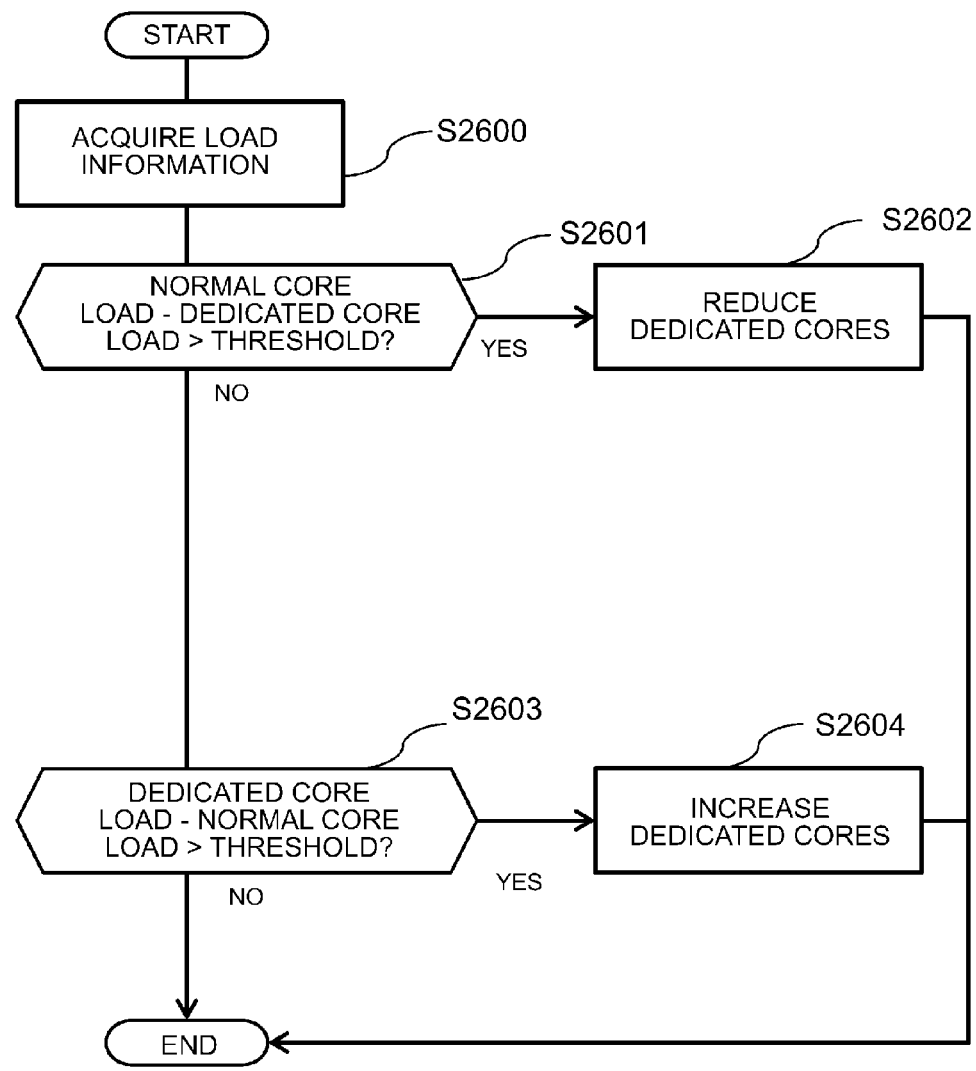
FIG. 20 is a flowchart of a dedicated core count adjustment program.

FIG. 20 is a flowchart of the dedicated core count adjustment program 220. The dedicated core count adjustment program 200 is executed at regular intervals, for example every minute. The dedicated core count adjustment program continuously monitors the load (operating rate) of each processor core, and sets a dedicated core when the processor load of a normal core is low (or creates a large dedicated core ratio) and the request transmission program 207 is able to prevent any overhead caused by interrupt requests being sent to the normal core. Meanwhile, the adjustment program 220 cancels a core with a dedicated core setting when the processor load of a normal core is high (or creates a small dedicated core ratio).

The dedicated core count adjustment program 220 acquires load information for each of the plurality of cores in S2600 and, in S2601, determines whether the difference obtained by subtracting the total value for the dedicated core load from the total value for the normal core load is equal to or more than a threshold. If the total value is equal to or more than the threshold, the dedicated core count adjustment program 220 reduces the [number of] dedicated cores (S2602).

The procedure for reducing the number of dedicated cores is as follows. The dedicated core count adjustment program 220a is able to reduce the number of dedicated cores of the internal system controller 100a or the external system controller 100b by changing the dedicated core determination table 113a of the internal system controller 100a to which this program belongs. Thereupon, the dedicated core count adjustment program 220a preferably updates the dedicated core determination table 113b of the external system controller 100b before updating the dedicated core determination table of the internal system controller 100a.

The dedicated core determination table 113 comprises information on the MPU 101a of the internal system controller and the MPU 101b of the external system controller, and is therefore shared information which is shared by the internal system controller and the external system controller, and gaining access in order to update this information is a target of prioritized processing. Therefore, access by the internal system controller 100a is made to the dedicated core of the external system controller 100b or is made to the interrupt communication area 143b of the normal core. Access from the internal system controller 100a to the external system controller 100b may be made by either a dedicated core or a normal core. The dedicated core count adjustment program 220a of the internal system controller awaits a response from the external system controller 100b and modifies the dedicated core determination table 113a of the internal system controller.

An update to the dedicated core determination table 113b of the external system controller 100b is prioritized over an update to the dedicated core determination table 113a of the internal system controller 100a because a request cannot be made in advance to a dedicated core of the internal system controller 100a by the external system controller 100b. Note that, although the internal system controller 100a updates the dedicated core determination table 113a after waiting for a response from the external system controller 100b, the table 113a of the internal system controller 100a may also be updated without waiting for a response from the external system controller 100b.

If, on the other hand, a negative determination is made in S2601, the dedicated core count adjustment program 220a determines whether the difference in the load obtained by subtracting the total load of the normal cores from the total load of the dedicated cores is equal to or more than the threshold (S2603). If the load is equal to or more than the threshold, the dedicated core count adjustment program 220a increases the dedicated cores (S2604). First, the dedicated core count adjustment program 220a updates the dedicated core determination table 113a of the internal system controller 100a. Thereupon, the dedicated core count adjustment program 220a assumes that a normal core whose attribute is to be changed to dedicated core is performing host I/O processing or other processing and changes the normal core to a dedicated core after awaiting completion of the processing after a fixed time has elapsed. Thereafter, the internal system controller 100a issues a request to the external system controller 100b to update the dedicated core determination table 113b as prioritized processing. Note that, the dedicated core count adjustment program 220a may also suspend all the request processing being processed and instantly switch the normal core to a dedicated core.

According to the second embodiment, because the ratio of dedicated cores is dynamically changed by comparing the dedicated core load with the normal core load, if the I/O processing load is high in comparison with the prioritized processing, the ratio of the normal cores is raised to expedite the I/O processing and, if the prioritized processing load is high in comparison with the I/O load, the ratio of the dedicated cores is raised to expedite the prioritized processing. As a result, even when a dedicated core which is dedicated to prioritized processing is configured in a multicore processor, there is always a high level of balance created between the I/O processing and the prioritized processing. According to the second embodiment, if the dedicated core load is high, access to the shared information may be requested by a normal core which has been set to receive interrupts.

Embodiment 3

The third embodiment is a modification of the second embodiment and is characterized by using Simultaneous Multi-Threading (SMT). By using SMT, a single physical core can be treated as a plurality of virtual cores called threads. These threads are called virtual cores. According to this embodiment, entries are prepared in a number corresponding to the number of virtual cores in the foregoing dedicated core determination table 113. Virtual core identification numbers are recorded in the core field. This embodiment is the same as the second embodiment in that one or more of the virtual cores can be set as a dedicated core.

This embodiment makes it possible, using SMT, to always place a virtual core in a HALT state (stopped state) and, as a result of an interrupt signal being generated, by a controller, in the virtual core of the external system controller, to start up the virtual core as a dedicated core. The embodiment is therefore advantageous in that compression of the processing performance of the other virtual cores (normal cores) is avoided by idling virtual cores with the dedicated core setting. Further, according to this embodiment, after setting a plurality of virtual cores as dedicated cores, one or more of these cores is stopped and placed on standby and, if a virtual core with a dedicated core setting which has not been stopped is stopped due to a fault or the like, a virtual core with a dedicated core setting can be failed over at high speed by transmitting an inter-core interrupt to the virtual core placed on standby and restoring the virtual core from the standby state.

Embodiment 4

A fourth embodiment will be described next as a modification of the foregoing second embodiment. This embodiment is characterized in that a decision is made regarding the requirements for determining that the processing which the request transmission program 207a of the controller requests from the external system controller 100b is complete and in that a request system for achieving this requirements is selected. Due to these characteristics, a table for determining the requirements and a table for selecting the request system for achieving these requirements is added to the local memory 11 (FIG. 16) of the MPU memory according to the second embodiment. An example of the former is called a request system requirement table and an example of the latter is called a request system usability table.

FIG. 21 is an example of a request system requirement table 114. The request system requirement table 114 is designated by the request transmission program 207a. The table comprises entries, designated by the request transmission program 207a, for recording an access destination 1140 of the external system controller 100b, an access type 1141 for the access destination, and an expected time (expected response time) 1142 until the MPU 101b of the external system controller executes access type-related processing on the access destination and sends back a response regarding completion of the processing to the request transmission source controller 100a.

FIG. 22A is a first example of a request system usability table 115. The request system usability table 115 comprises a request destination field 1153 for defining a core of the external system controller 100b to which the request transmission program 207a is to transmit request information, a request system field 1150 for defining the communication type from the request transmission program, a usability field 1151 for defining whether the request destination core is able to process a request, and an expected response time field 1152 for defining the time until a response is sent back to the request source controller after the request source controller transmits request information to the request destination controller and the request destination core processes the request information. The expected response time fluctuates according to the load on each core. The configuration management program continuously monitors the load on each core and updates the expected response time according to requirements.

FIG. 22B is a second example of the request system usability table 115. A core 0 and a core 1 are the dedicated cores. Therefore, a request transmitted to the core 0 or the core 1 does not have to be the interrupt request, but may be a request for the normal processing. When the dedicated core load is low, the expected response time of the core 0 or the core 1 is low. Thus, it is generally more advantageous to transmit the request for normal processing to the dedicated core such as the core 0 or the core 1, than transmitting the interrupt request to the normal core such as a core 2. However, when the load of the dedicated core such as the core 0 or the core 1, becomes high, the expected response time may be shorter to transmit the interrupt request to the normal core such as the core 2 than to transmit the request for the normal processing to the dedicated core such as the core 0 or the core 1.

Figure 23:
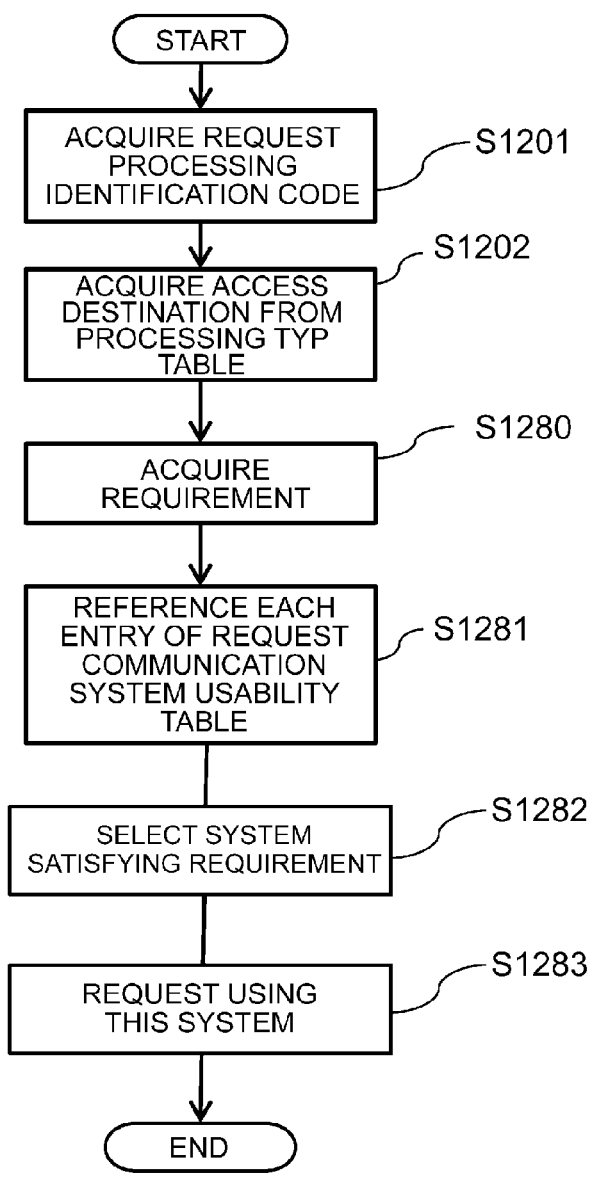
FIG. 23 is a flowchart of a request transmission program according to a fourth embodiment.

FIG. 23 is a flowchart of the request transmission program 207 according to this embodiment. The difference from the foregoing flowcharts of FIGS. 5 and 19 is that step S1203 and subsequent steps are replaced with steps S1280 to S1283. In step S1280, which follows step S1202, the request transmission program 207 references the request system requirement table 114 to acquire the hardware 1140 which is the access destination and the expected response time 1142 as the requirement corresponding to the access type.

The requirement transmission program 207 then references the request system usability table 115 (step S1281) and selects a combination of each of the attributes of the request destination 1153, the request system 1150, and the usability 1151, which satisfies the requirement 1142 (expected response time) (step S1282). To satisfy the requirement, the expected response time contained in the expected response time field 1152 in the request system usability table 115 is equal to or less than the expected response time 1142 for the access type acquired in step S1280. The request transmission program 207a performs access due to the request to the external system controller 100b in accordance with the request system selected on the basis of the request system usability table 115, that is, the communication system with the request destination core 1153 (interrupt communication or normal communication) 1150 (step S1283).

The dedicated core count adjustment program 220 updates the request system usability table 115 by determining the load status for each core. If a normal core has a high load due to host I/O processing, a long expected response time for the normal communication system is set long. Meanwhile, if the load is low, the expected response time for the normal communication system is set short. In the former case, the expected response time of the interrupt communication system is shorter than the expected response time of the normal communication system and, in the latter case, the opposite is true. The expected response time of the normal communication system is determined according to the queue model or the like, for example.

In FIG. 21, because the completion response time of access to the shared memory 12b of the second controller 100b by the first controller 100a, that is, a read, write (non-posted write, atomic update) is 10 microseconds, hereinafter the system enabling a response to the first controller 100a is, according to FIG. 22A,B, a non-core selection normal communication system or a core 1 normal communication system for the processor 101b of the second controller 100b. The expected response time of a dedicated core need not always be shorter than a normal core and communication of an interrupt system need not always be shorter than communication of a normal system. Which core is used and which system of communication is able to satisfy the expected response time varies according to the core load and the I/O processing load. In the non-core selection normal communication system, the request destination core is not designated, and any one or more of the plurality of cores may receive requests. The communication area is divided into the communication area for the individual cores, and the communication area shared by the cores. When the request is written to the communication area for the individual cores, the core 1 normal communication system is set. When the request is written to the communication area shared by the cores, the non-core selection normal communication system is set. When the non-core selection normal communication system is set, the response time becomes generally shorter than when the request destination core is designated because the core that has completed the I/O processing receives the request. In such case, exclusive control is required for the core to read the request from the communication area.

Embodiment 5

A fifth embodiment which is a modification of the fourth embodiment will now be described. In the fifth embodiment, an example is shown in which the user decides on the performance requirements for I/O processing and accordingly corrects the expected response time for communication. A case is shown where the performance requirement for the I/O processing is the response time (the desired time until a response is sent back from the storage system after the host issues an I/O command).

FIG. 24 is a configuration example of a volume performance requirement table 116 in which the foregoing performance requirement is decided for each volume. The volume performance requirement table is added to the local memory 11 of the MPU memory 102. The volume performance requirement table 116 comprises a plurality of entries which comprise a volume number field 1161 and an expected communication response time correction value field 1162. The volume number field 1161 stores numbers for identifying volumes in the storage system and the expected response time correction value field 1162 enables the requirement used in selecting the communication system to be corrected in communications due to the I/O request to the volume.

Figure 25:
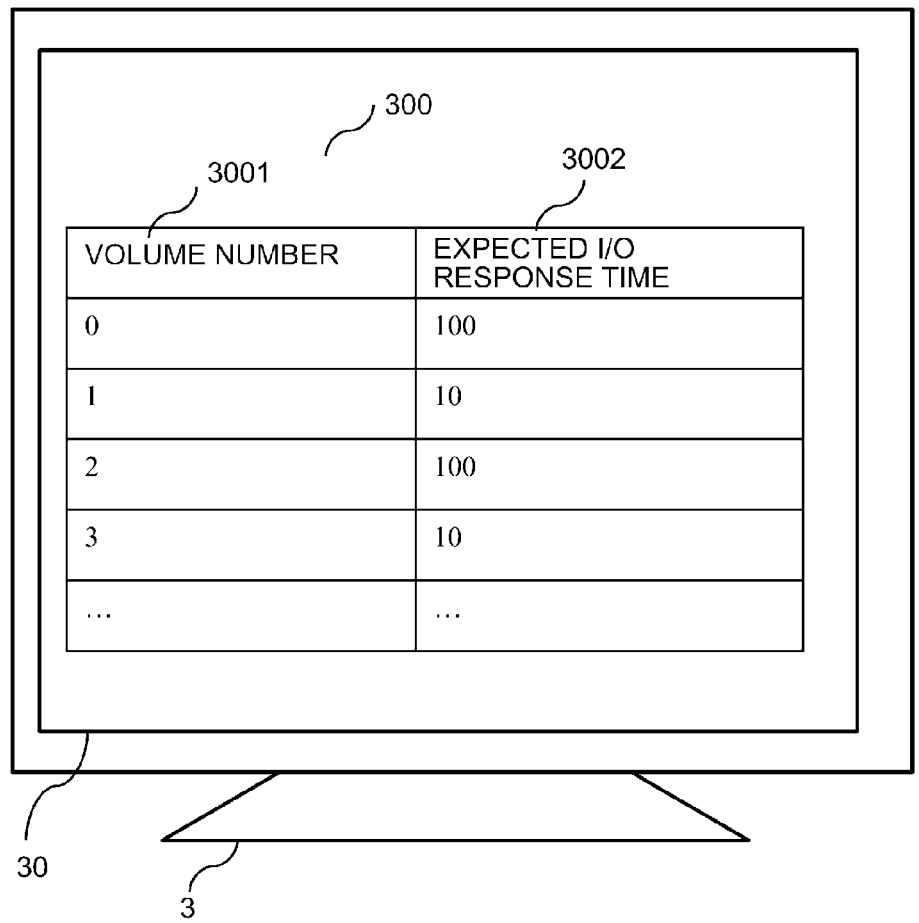
FIG. 25 is an example of an input screen enabling a user to set a volume I/O performance requirement.

FIG. 25 shows an input screen enabling the user to set the I/O performance requirements for volumes. This screen is displayed on the management terminal 3 and the user inputs performance requirements for each volume via this screen. The screen displays a performance requirement input table 300 for defining performance requirements. The performance requirement input table 300 displays entries comprising two input fields, namely, a volume number field 3001 and an expected I/O response time field 3002.

The user inputs volume numbers 3001 for the volumes for which the requirements in each field are determined and inputs the expected response times for an I/O response for the volumes as the expected I/O response time 3002. Upon receiving an input, the management terminal 3 outputs the information to the storage system 4. The storage configuration management program 201 adds a new entry to the volume performance requirement table 116, inputs a volume number which is input to the volume number field of the added entry, and stores a correction value which is determined from the expected I/O response time thus input in the expected communication response time correction value field.

The way the correction value is found is, for example, by determining a standard I/O response time, and the ratio of the expected I/O response time for the standard I/O response time may be the expected communication response time correction value. Thus, for a volume with a short expected I/O response time, a request system with a short communication response time in comparison with a volume with a long expected I/O response time is selected. A system for requesting a short communication response time is described in the fourth embodiment. Accordingly, if there is a mixture of I/O requests to volumes which have different performance requirements, I/O processing on volumes with strict performance requirements is prioritized so that the performance requirements of each volume can, on the whole, be satisfied.

Figure 26:
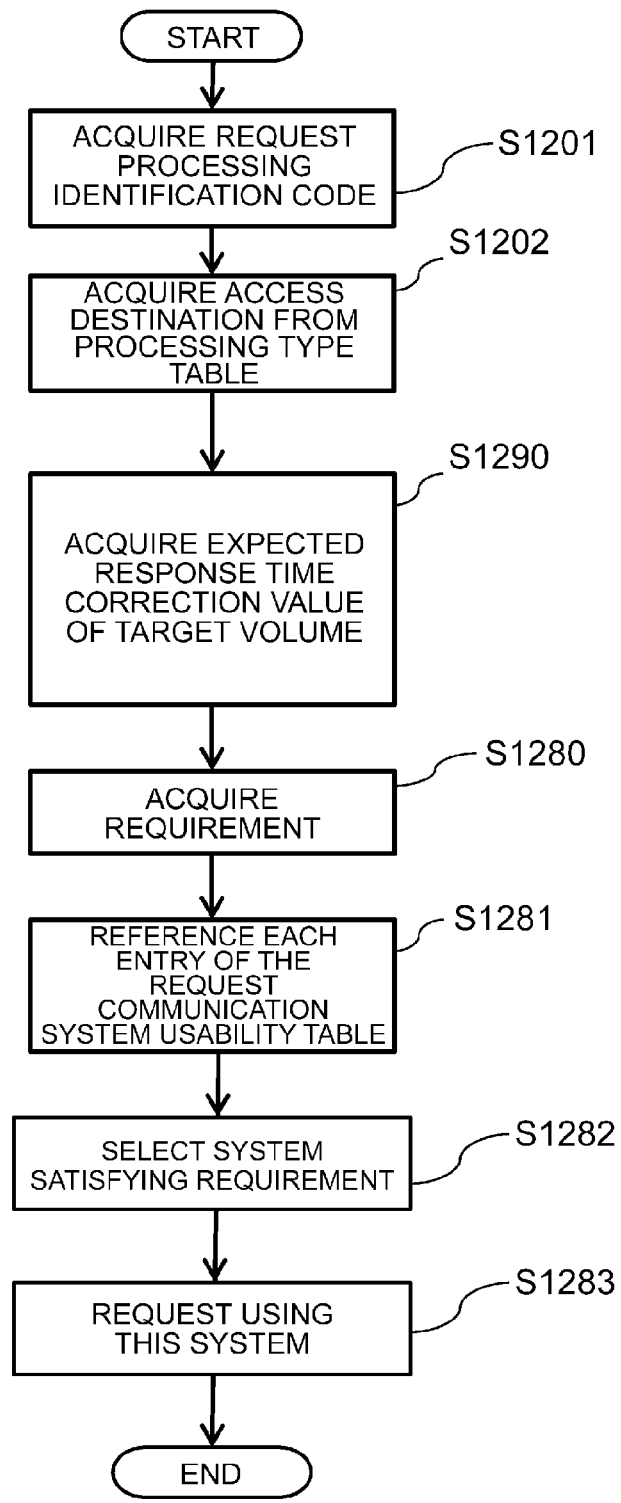
FIG. 26 is a flowchart for correcting the expected communication response time.

The specific procedure for correcting the expected communication response time is shown in FIG. 26. FIG. 26 is a modification of FIG. 23. The difference is that, first of all, when the request transmission program 207 is called up, information indicating that callup is associated with I/O processing on a particular volume is passed on to the request transmission program 207 from the basic I/O program 202 which is the caller program. This information includes the volume number. This is called the target volume number. Further, step S1290 is added before step 1280 in addition to the flow of FIG. 23.

In step S1290, [the request transmission program 207] refers to the volume performance requirement table 116 to acquire the value which is stored in the expected communication response time correction value field 1162 for the entry which corresponds to the target volume number. This value is then corrected by being multiplied by the expected response time value acquired in step S1280 which follows. By taking the corrected expected response time value as the communication system requirement and performing the processing of the following step 1281 and subsequent processing, a communication system can be selected according to the performance requirements of each volume. As a result, a communication system for which the expected value for the communication response time is small can be selected for the communications associated with the I/O processing of the volume for which the I/O response performance is requested, and the I/O performance requirements for the volume can be fulfilled.

Note that, in this embodiment, an example is shown in which the expected response time is corrected by means of a method of integrating the coefficients determined according to the I/O performance requirements for each volume, but the I/O performance requirements for each volume input by the user, for example, may also be corrected to a predetermined expected communication response time depending on whether the time drops below a predetermined threshold. Furthermore, although performance requirements are decided for each volume in this embodiment, performance requirements may also be determined for each host which issues an I/O, for example. In addition, instead of using the response time as the I/O performance requirement, the performance requirement may be determined by the throughput performance (the number of I/O commands or the amount of data with which a response is sent back to the host for each unit of time). In this case, the higher the value of the throughput performance requested, the shorter the expected response time for the communication associated with the I/O processing that is set.

Note that the present invention is not limited to the foregoing embodiments, rather, a variety of modifications are included. For example, the foregoing embodiments were described in detail in order to describe the present invention in a way that is easy to understand but the present invention is not necessarily limited to comprising all the configurations described. Further, some of the configurations of a certain embodiment can also be replaced with configurations from other embodiments, and configurations from the other embodiments can also be added to the configuration of a certain embodiment. Moreover, other configurations can also be added to, deleted from, or replace some of the configurations of each embodiment. Further, some or all of the foregoing configurations, functions, processing units, and processing means and so on may also be implemented by hardware by means of an LSI design or the like, for example. Further, each of the configurations and functions and the like may also be realized by software as a result of the processor interpreting and executing programs which realize the respective functions. In addition, control wires and connecting wires which are considered necessary for the description may be shown but not all the wires need necessarily be shown for manufacturing purposes. In reality, mutually connecting almost all the configurations may also be considered.

The communication area to which the requests from the processor of the controller are written, is divided into the interrupt communication area, and the normal communication area, in the first, second, third, fourth, and fifth embodiments. However, the communication area does not have to be divided, and may hence be shared. Thus, the processing may be switched between the prioritized processing and the non-prioritized processing (normal processing), based on whether the interrupt signal for the prioritized processing exists.

The invention claimed is:

1. A storage system comprising:
    a first controller and
    a second controller coupled to each other,
    wherein the first controller includes a first processor and a first shared memory, and the second controller includes a second processor and a second shared memory; and
    wherein data stored in the first shared memory and the second shared memory is to be used by the first processor and the second processor,
    wherein the first processor is configured to:
        receive an I/O request from a host coupled to the storage system;
        transmit request information to the second processor to be processed by the second processor according to the I/O request;
        wherein when the request information requests the second processor to access the second shared memory, the request information is transmitted as first request information indicating its priority to the second processor, and the first processor is configured to wait for a response from the second processor before processing a next process; and
        wherein when the request information requests the second processor to transfer data, the request information is transmitted as second request information which requests data transmission to the second processor without priority indication, and the first processor is configured to process the next process without waiting for the response from the second processor,
    wherein the second processor is configured to:
        prioritize a processing of the first request information over other processes;
        not prioritize a processing of the second request information over other processes; and
        send back the response to the first processor.

2. The storage system according to claim 1,
    wherein the first processor is configured to transmit the first request information to a first area of the second controller,
    wherein the first processor is configured to transmit the second request information to a second area of the second controller, and
    wherein the second processor is configured to process the first request information stored in the first area with greater priority than the second request information stored in the second area.

3. The storage system according to claim 2,
    wherein the first area is a first recording unit in which information pertaining to interrupt processing for the processing of I/Os from the host is recorded,
    wherein the second area is a second recording unit in which information pertaining to non-interrupt processing for the processing of I/Os from the host is recorded,
    wherein, upon receiving, from the first processor, notice that the first request information for which processing is to be prioritized has been transmitted to the first recording unit, the second processor is configured to prioritize the processing of the first request information over the processing of I/Os from the host.

4. The storage system according to claim 3,
    wherein, when a predetermined number or more of request information items are recorded in the first area, the first processor is configured to transmit an interrupt request to the second processor, and, wherein, upon receiving the interrupt request, the second processor is configured to collectively process the predetermined number or more of request information items recorded in the first area.

5. The storage system according to claim 2,
    wherein the second processor is configured from a plurality of cores,
    wherein the first area is one or more dedicated cores among the plurality of cores,
    wherein the second area is a normal core other than the dedicated cores among the plurality of cores,
    wherein the dedicated cores prioritize the processing of the request information over the processing of I/Os from the host,
    wherein the normal cores perform processing of the request information together with processing of I/Os from the host, and
    wherein the first processor is configured to transmit the first request information for which processing is to be prioritized to the dedicated cores by prioritizing the dedicated cores over the normal cores.

6. The storage system according to claim 5,
    wherein the second processor is configured to change the ratios of the dedicated cores and the normal cores among the plurality of cores in accordance with load states of the plurality of cores.

7. The storage system according to claim 5,
    wherein, if the load on the dedicated core is high, the first processor is configured to cause the normal cores to prioritize the processing of the request information over the processing of I/Os from the host.

8. The storage system according to claim 5, wherein a plurality of virtual cores can be configured in the second processor and one or more of the plurality of virtual cores are changed from the normal cores to the dedicated cores by means of a request from the first processor.

9. The storage system according to claim 1, wherein the second request information is for requesting startup, for the purpose of data transfer, of hardware resources of the second controller.

10. The storage system according to claim 1, wherein, when an I/O is received from the host, the first processor is configured to determine whether data stored in the second shared memory has been updated and, upon determining that the data stored in the second shared memory has been updated, the first processor is configured to transmit the first request information to read the shared information of the second controller to the second processor.

11. The storage system according to claim 1, wherein the first processor is configured to determine the response time required of the second processor, to which the request information is transmitted, in accordance with the access destination hardware of the second controller and the access type, and wherein the first processor is configured to select a transmission format for transmitting the request information to the second processor in order to satisfy this response time.

12. The storage system according to claim 11, wherein the first processor is configured to correct the response time required of the second processor.

13. A control method enabling a storage system comprising a first controller and a second controller coupled to each other, wherein the first controller includes a first processor and a first shared memory, and the second processor includes a second processor and a second shared memory; and wherein data stored in the first shared memory and the second shared memory is to be used by the first processor and the second processor, comprising:
   receiving, by the first controller, an I/O request from a host coupled to the storage system;
   transmitting, by the first controller, request information which is to be processed by the second processor according to the I/O request;
   wherein, when the request information requests the second processor to access the second shared memory, the request information is transmitted as first request information indicating its priority to the second processor, and the first controller waits for a response from the second processor before processing the next process;
   wherein, when the request information requests the second processor to transfer data, the request information is transmitted as second request information which requests data transmission to the second processor without priority indication, and the first controller processes the next process without waiting for a response from the second processor;
further the control method comprising:
   prioritizing, by the second controller, a processing of the first request information over other processes;
   not prioritizing, by the second controller, a processing of the second request information over other processes; and
   sending back, by the second controller, the response to the first processor.

14. The control method according to claim 13, transmitting, by the first processor, the first request information to a first area of the second controller;
transmitting, by the first processor, the second request information to a second area of the second controller; and
processing, by the second processor, the first request information stored in the first area with greater priority than the second request information stored in the second area.

15. The control method according to claim 14, wherein the first area is a first recording unit in which information pertaining to interrupt processing for the processing of I/Os from the host is recorded,
wherein the second area is a second recording unit in which information pertaining to non-interrupt processing for the processing of I/Os from the host is recorded; and
prioritizing, by the second processor, the processing of the first request information over the processing of I/Os from the host upon receiving, from the first processor, notice that the first request information for which processing is to be prioritized has been transmitted to the first recording unit.

16. The control method according to claim 15, transmitting, by the first processor, an interrupt request to the second processor when a predetermined number or more of request information items are recorded in the first area; and
collectively processing, by the second processor, the predetermined number or more of request information items recorded in the first area upon receiving the interrupt request.

17. The control method according to claim 13, wherein the second request information is for requesting startup of hardware resources of the second controller for the purpose of data transfer.

18. The control method according to claim 13, determining, by the first processor, whether data stored in the second shared memory has been updated when an I/O is received from the host; and
transmitting, by the first processor, the first request information to read the shared information of the second controller to the second processor upon determining that the data stored in the second shared memory has been updated.

* * * * *